(12) United States Patent
Flowers

(10) Patent No.: US 8,292,326 B2
(45) Date of Patent: Oct. 23, 2012

(54) STABILIZER FOR THREE WHEEL VEHICLE

(75) Inventor: Michael J. Flowers, Mantua, NJ (US)

(73) Assignee: Flowers IP L.L.C., Mantua, NJ (US)

( * ) Notice: Subject to any disclaimer, the term of this patent is extended or adjusted under 35 U.S.C. 154(b) by 202 days.

(21) Appl. No.: 12/661,728

(22) Filed: Mar. 23, 2010

(65) Prior Publication Data
US 2010/0244421 A1 Sep. 30, 2010

Related U.S. Application Data

(60) Provisional application No. 61/210,974, filed on Mar. 24, 2009, provisional application No. 61/269,399, filed on Jun. 24, 2009.

(51) Int. Cl.
B60R 21/00 (2006.01)
(52) U.S. Cl. ....................................... 280/755
(58) Field of Classification Search .................. 280/755, 280/771, 776, 87.2, 89.1, 137.5, 137.502; 180/21, 22, 210, 211
See application file for complete search history.

(56) References Cited

U.S. PATENT DOCUMENTS

| | | | | |
|---|---|---|---|---|
| 3,664,532 A | * | 5/1972 | Gustafson | 414/440 |
| 4,705,284 A | * | 11/1987 | Stout | 280/250.1 |
| 5,467,838 A | * | 11/1995 | Wu | 180/209 |
| 7,338,061 B2 | * | 3/2008 | Bullis | 280/419 |
| 8,091,658 B2 | * | 1/2012 | Peng | 180/65.1 |
| 2002/0135146 A1 | * | 9/2002 | Hsing | 280/87.021 |
| 2009/0314568 A1 | * | 12/2009 | Brown et al. | 180/209 |

FOREIGN PATENT DOCUMENTS

GB 2440322 A * 1/2008

* cited by examiner

Primary Examiner — Faye M. Fleming
(74) Attorney, Agent, or Firm — Frijouf, Rust & Pyle P.A.

(57) ABSTRACT

A stabilizer is disclosed for a three-wheel vehicle having a frame extending between a front portion and a rear portion. The front portion of the frame supports a front steering wheel and with the rear portion of the frame supports plural driving wheels. The stabilizer comprises a right and a left stabilizing wheel mounted on a right and a left side of the frame. The right and left stabilizing wheels are positioned above the supporting surface when the three-wheel vehicle moves in a straight direction on a supporting surface. The right and left stabilizing wheels engage the supporting surface when the vehicle is turned in a right and a left direction respectively for stabilizing the three-wheel vehicle while maintaining steering ability. Preferably, the stabilizer includes a right and a left director for directing the right and left stabilizing wheels in a forward direction when the right and left stabilizing wheels are positioned above the supporting surface. The invention is also incorporated into an accessory stabilizer unit adapted for mounting onto existing three-wheel vehicles.

21 Claims, 16 Drawing Sheets

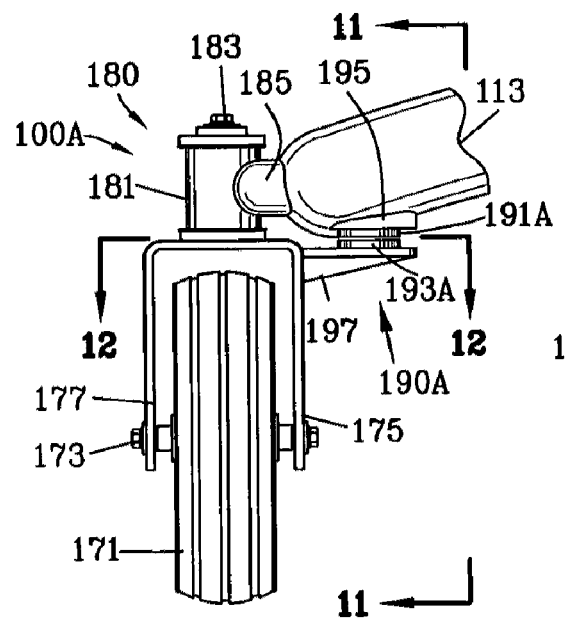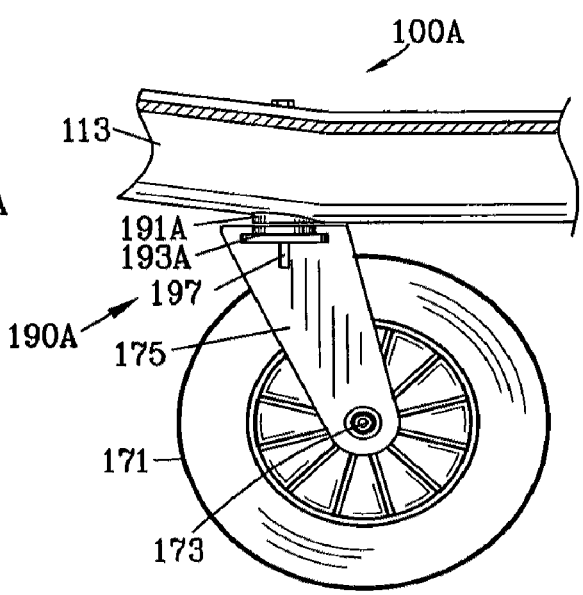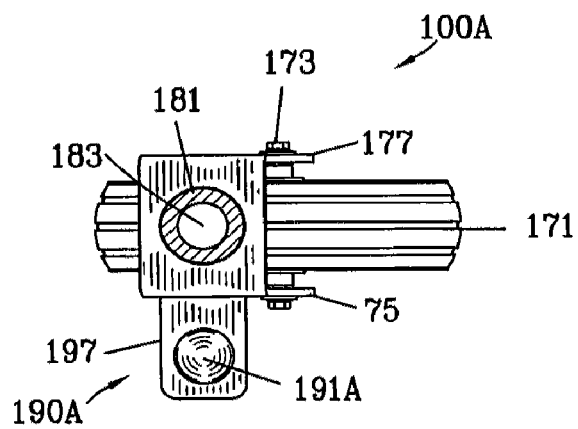

PRIOR ART

PRIOR ART

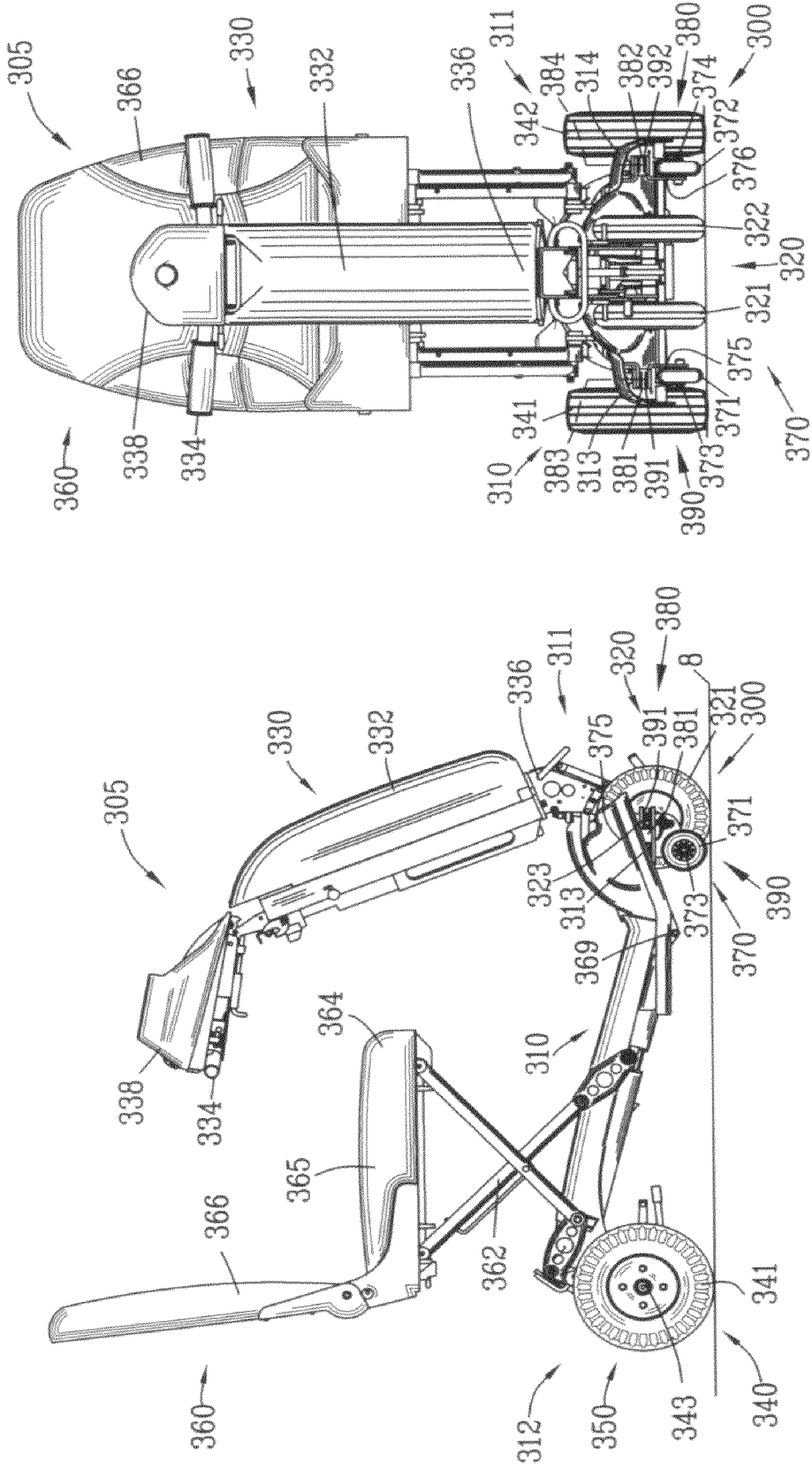

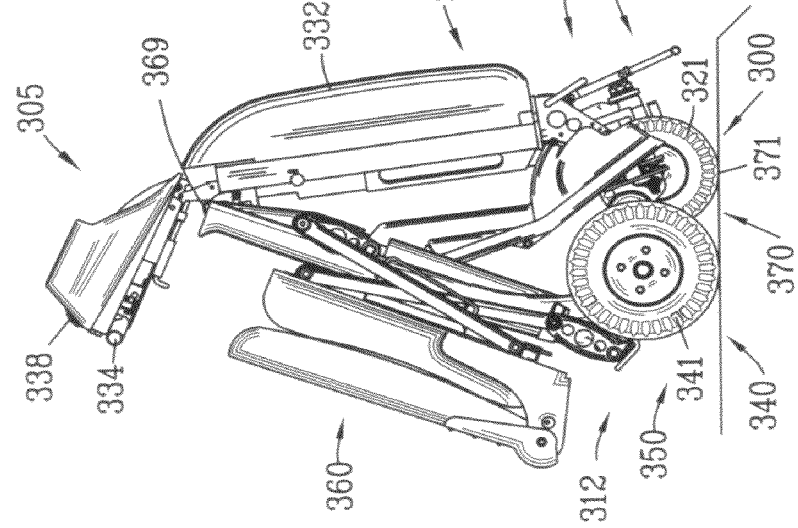

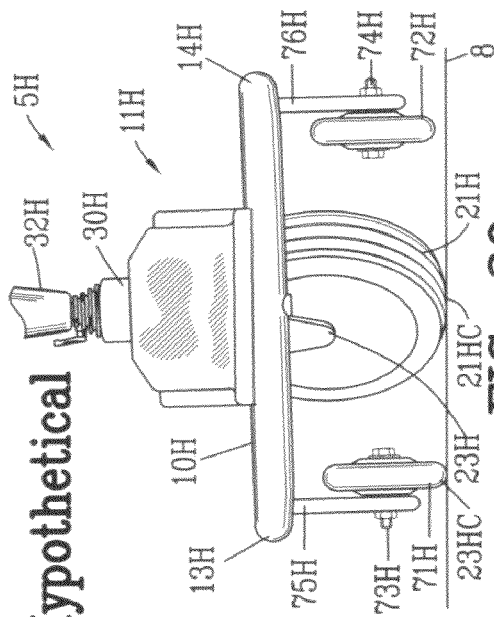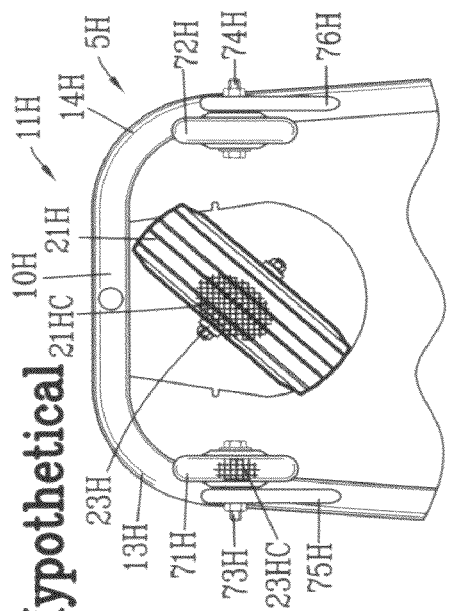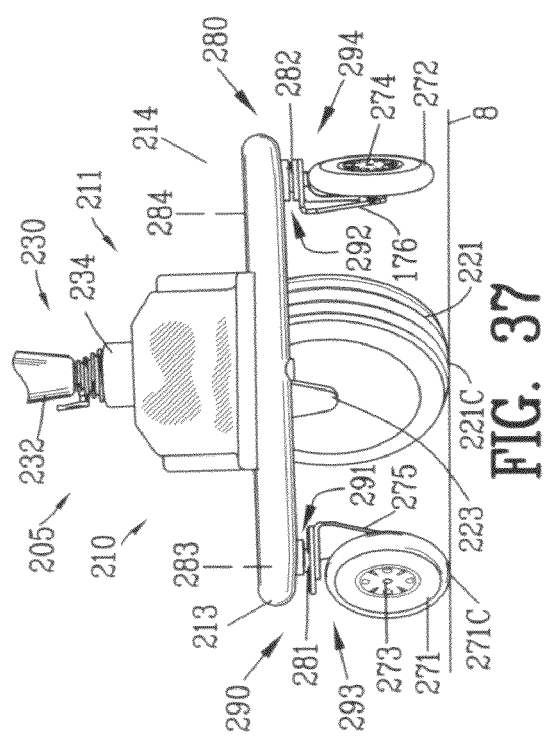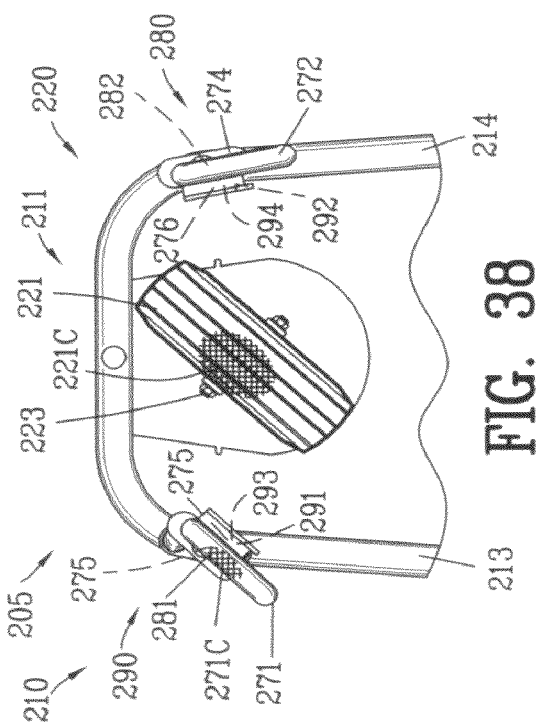

STABILIZER FOR THREE WHEEL VEHICLE

CROSS-REFERENCE TO RELATED APPLICATIONS

This application claims benefit of U.S. patent provisional application No. 61/210,974 filed Mar. 24, 2009 and U.S. patent provisional application No. 61/269,399 filed Jun. 24, 2009. All subject matter set forth in provisional application No. 61/210,974 filed Mar. 24, 2009 and provisional application No. 61/269,399 filed Jun. 24, 2009 is hereby incorporated by reference into the present application as if fully set forth herein.

BACKGROUND OF THE INVENTION

1. Field of the Invention

This invention relates to vehicles and more particularly to a stabilizer for stabilizing a three-wheel vehicle when the vehicle is turned in a right and a left direction.

2. Background of the Invention

A scooter type personal mobility vehicle typically comprises an elongated frame having front single or plural steering wheels and plural rear drive wheels. The front single or plural steering wheels are pivotably mounted on the front portion of the elongated frame. A handlebar is provided for pivoting the front single or plural steering wheels for steering the personal mobility vehicle.

The plural rear wheels are mounted on independent axially aligned shafts driven by a single electric motor though a differential gearbox. The electric motor is controlled by a variable speed controller and a forward and reverse engager located on the handlebar of the scooter. The scooter type personal mobility vehicle is well suited for unconfined areas such as outside use due to the superior ride of the elongated wheelbase of the scooter. The elongated wheelbase having plural rear wheels and front wheels provides stability for the scooter type personal mobility vehicle.

A scooter type personal mobility vehicle having a single front steering wheel and plural rear drive wheels exhibit instability during the turning of the three-wheel vehicle. The turning instability of scooter type personal mobility vehicles having a single front steering wheel is also present in other three-wheel vehicles having a single front steering wheel.

Therefore, it is an object of the invention to provide a stabilizer for a three-wheel vehicle for stabilizing the three-wheel vehicle during the turning of the three-wheel vehicle.

Another object of the invention is to provide a stabilizer for a three-wheel vehicle that is adaptable to existing three-wheel vehicles.

Another object of the invention is to provide a stabilizer for a three-wheel vehicle that is active only during the turning of the three-wheel vehicle.

Another object of the invention is to provide an accessory stabilizer unit adapted for mounting onto an existing three-wheel vehicle.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to a stabilizer for a three-wheel vehicle. The three-wheel vehicle has a frame extending between a front portion and a rear portion. The front portion of the frame supports a front steering wheel with the rear portion of the frame supporting plural driving wheels for moving the three-wheel vehicle on a supporting surface. The improved stabilizer comprises a right and a left stabilizing wheel mounted on a right and a left side of the frame. The right and left stabilizing wheels are positioned above the supporting surface when the three-wheel vehicle moves in a straight direction on the supporting surface. The right and left stabilizing wheels engage the supporting surface when the vehicle is turned in a right and a left direction respectively for stabilizing the three-wheel vehicle. Although the stabilizer of the present invention is applicable to most three-wheel vehicles, the stabilizer of the present invention is especially suitable for use with a scooter type personal mobility vehicle.

In a more specific example of the invention, a front pivotable axis pivots the front steering wheel to steer the three-wheel vehicle. A front rotational axis rotates the front steering wheel upon movement of the three-wheel vehicle on the supporting surface. The front pivotable axis is perpendicular to the front rotational axis. A rear rotational axis rotates the plural drive wheels for moving the three-wheel vehicle on the supporting surface. The front pivotable axis is perpendicular to the front rotational axis and the rear drive axis.

In another specific example of the invention, a right stabilizing pivoting axis pivots the right stabilizing wheel. A right stabilizing rotational axis rotates the right stabilizing wheel upon engagement with the supporting surface. A left stabilizing pivoting axis pivots the left stabilizing wheel. A left stabilizing rotational axis rotates the left stabilizing wheel upon engagement with the supporting surface. The right stabilizing pivoting axis is generally parallel to the left stabilizing pivoting axis.

Preferably, the stabilizer incorporates a right and left director for directing the right and left stabilizing wheels in a forward direction when the right and left stabilizing wheels are positioned above the supporting surface. In one example, the right and left directors are incorporated into a right and left magnetic director for directing the right and left stabilizing wheels in a forward direction when the right and left stabilizing wheels are positioned above the supporting surface.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which:

FIG. 10 is a view similar to FIG. 7 of an alternate example of the director of the present invention;

FIG. 11 is a view along line 11-11 in FIG. 10;

FIG. 12 is a view along line 12-12 in FIG. 10;

FIG. 31 is a side view of an example of a three-wheel vehicle of the prior art with an accessory stabilizer unit mounted thereto;

FIG. 32 is a front view of FIG. 31;

FIG. 33 is a side view of the three-wheel vehicle of FIG. 31 in a folded condition;

FIG. 34 is a magnified view of a portion of FIG. 31 illustrating the accessory stabilizer unit;

FIG. 35 is an enlarged front view of a portion of FIG. 34;

FIG. 36 is a top view of FIG. 35;

FIG. 37 is a front view of the of the three-wheel vehicle of FIGS. 15-24 illustrating the right stabilizing wheel during a left turn;

FIG. 38 is a bottom view of FIG. 37;

FIG. 39 is a front view of a hypothetical three-wheel vehicle incorporating fixed large anti-tip wheels illustrating the right anti-tip wheel during a left turn; and FIG. 40 is a bottom view of FIG. 39.

Similar reference characters refer to similar parts throughout the several Figures of the drawings.

DETAILED DISCUSSION

Figure 1:
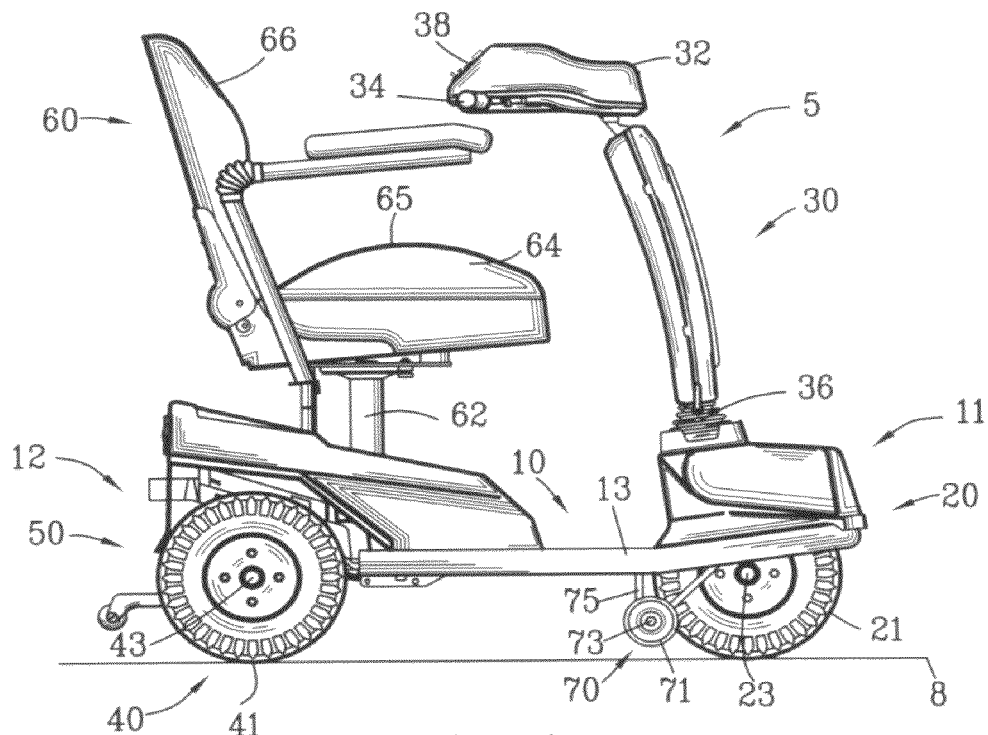
FIG. 1 is a side view of a three-wheel vehicle of the prior art illustrated as a personal mobility vehicle with an anti-tip wheel.
Figure 2:
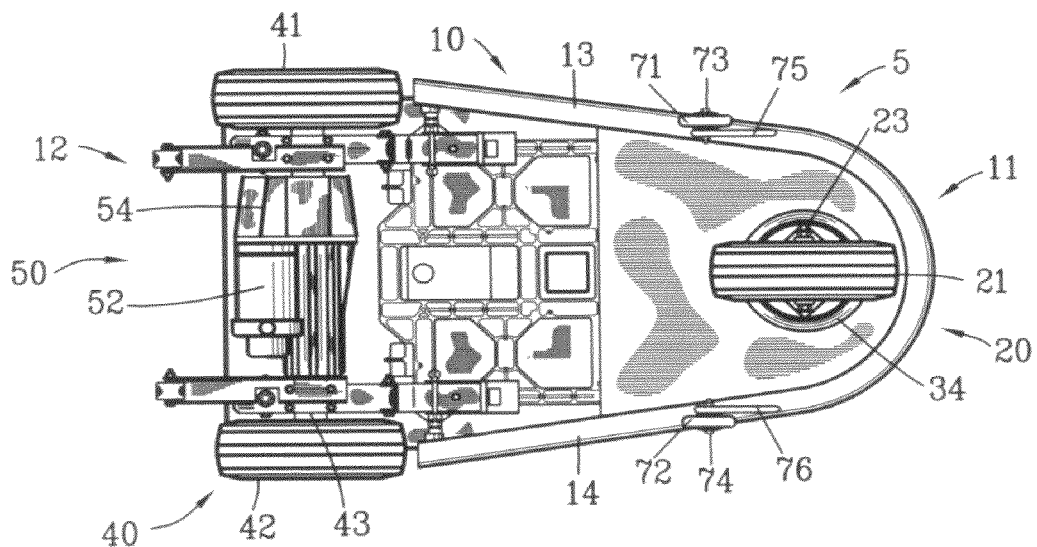
FIG. 2 is a bottom view of FIG. 1.
Figure 3:
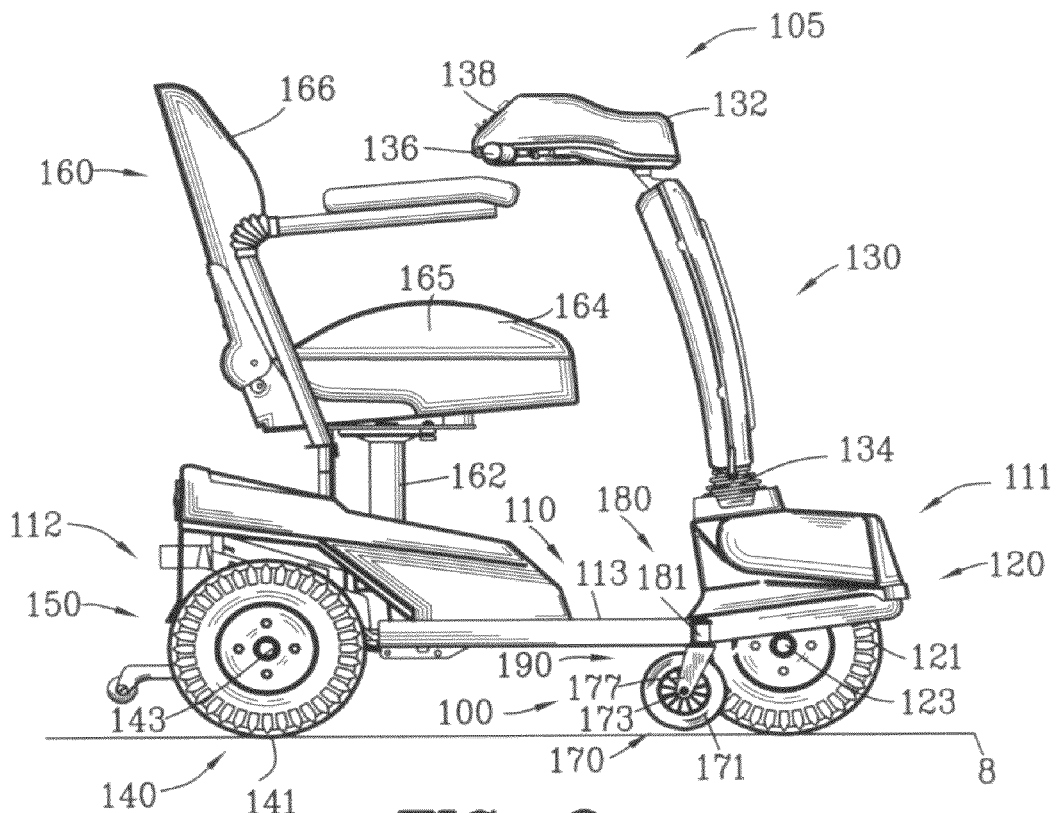
FIG. 3 is a side view of a first embodiment of the stabilizer of the present invention incorporated into a three-wheel vehicle illustrated as a personal mobility vehicle.
Figure 4:
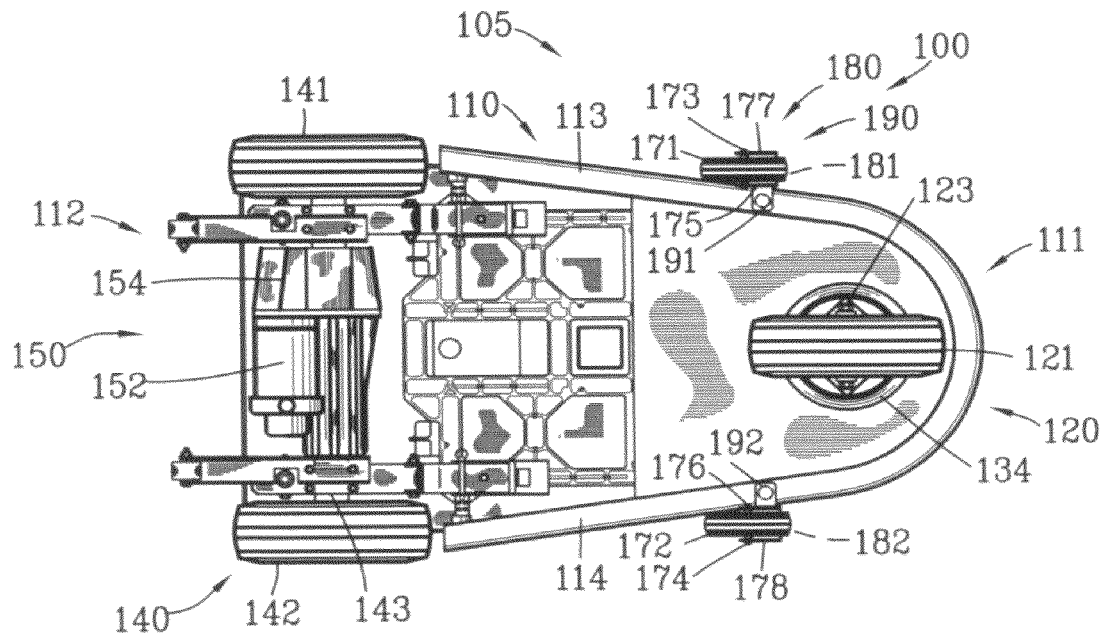
FIG. 4 is a bottom view of FIG. 3.

FIGS. 1 and 2 are side and bottom views of a three-wheel personal mobility vehicle 5 of the prior art. The three-wheel personal mobility vehicle 5 comprises a frame 10 comprising a front frame portion 11 and a rear frame portion 12. The front frame portion 11 comprises frame members 13 and 14. The front frame portion 11 supports a front wheel assembly 20 including a steering mechanism 30 whereas the rear frame portion 12 supports a rear wheel assembly 40 including a drive unit 50.

The front wheel assembly 20 comprises a front wheel 21 rotatably mounted on a front axle 23. The steering mechanism 30 is connected to the front wheel assembly 20. The steering mechanism 30 includes a tiller 32 comprising a handlebar assembly 34 connected to a front steering pivot 36. The front axle 23 is orientated in a generally horizontal plane whereas the front steering pivot 36 is orientated in a generally vertical plane and perpendicular to the front axle 23.

The front steering pivot 36 is mounted to the front wheel 21 for enabling an operator to pivot the front steering wheel 21. A movement of the tiller 32 by an operator causes movement of the front steering wheel 21 to alter the direction of the three-wheel personal mobility vehicle 5. Control switches 38 are located on the tiller 32 for enabling an operator to control the speed and the rotational direction of the three-wheel personal mobility vehicle 5.

The rear wheel assembly 40 comprises plural drive wheels 41 and 42 mounted on a drive shaft 43. A drive unit 50 is connected to the rear wheel assembly 40 for driving the three-wheel personal mobility vehicle 5. The drive unit 50 comprises an electric drive motor 52 is connected through a gearbox 54 for driving the plural drive wheels 41 and 42 through the drive shaft 43 and the gearbox 54. The electric drive motor 52 is powered by a rechargeable battery (not shown) and is controlled by the control switches 38 located on the tiller 32.

A seat assembly 60 is mounted to the rear frame portion 12 of the three-wheel personal mobility vehicle 5. The seat assembly 60 comprises a pedestal 62 mounted to the rear frame portion 12 for rotatably supporting a seat 64. The seat 64 comprises a seat base 65 and a backrest 66.

The three-wheel personal mobility vehicle of the prior art was provided with fixed wheels 70 comprising fixed wheels 71 and 72. The fixed wheels 71 and 72 are rotatably mounting by axles 73 and 74 to fixed brackets 75 and 76. The fixed brackets 75 and 76 are secured to the frame members 13 and 14 of the front frame portion 11 of the frame 10.

The fixed brackets 75 and 76 are secured to the frame members 13 and 14 of the front frame portion 11 of the frame 10. The axels 73 and 74 of the fixed wheels 71 and 72 are fixed in a position to be parallel to the drive shaft 43 interconnecting the plural drive wheels 41 and 42. Typically, each of the fixed wheels 71 and 72 had a diameter approximately twenty percent (20%) of the diameter of the front steering wheel 21. Furthermore, each of the fixed wheels 71 and 72 were located approximately two (2) inches off of the ground.

The fixed wheels 71 and 72 were intended to stabilize the movement of the prior art three-wheel mobility vehicle 5 during extreme right and left turns of the three-wheel mobility vehicle 5. Unfortunately, the fixed wheels 71 and 72 of the prior art three-wheel mobility vehicle 5 did not completely stabilize the movement of the three-wheel personal vehicle in high-speed turns and over uneven terrain.

FIGS. 3-6 are various views of a first embodiment of the stabilizer 100 of the present invention incorporated into a three-wheel vehicle 105 illustrated as a personal mobility vehicle. The three-wheel personal mobility vehicle 105 comprises a frame 110 comprising a front frame portion 111 and a rear frame portion 112 defined by frame members 113 and 114. The front frame portion 111 supports a front wheel assembly 120 including a steering mechanism 130 whereas the rear frame portion 112 supports a rear wheel assembly 140 including a drive unit 150.

The front wheel assembly 120 comprises a front wheel 121 rotatably mounted on a front axle 123. The steering mechanism 130 is connected to the front wheel assembly 120. The steering mechanism 130 includes a tiller 132 comprising a handlebar assembly 134 connected to a front steering pivot 136. The front axle 123 is orientated in a generally horizontal plane whereas the front steering pivot 136 is orientated in a generally vertical plane and perpendicular to the front axle 123.

The front steering pivot 136 is mounted to the front wheel 121 for enabling an operator to pivot the front steering wheel 121. A movement of the tiller 132 by an operator causes movement of the front steering wheel 121 to alter the direction of the three-wheel personal mobility vehicle 105. Control switches 138 are located on the tiller 132 for enabling an operator to control the speed and the rotational direction of the three-wheel personal mobility vehicle 105.

The rear wheel assembly 140 comprises plural drive wheels 141 and 142 mounted on a drive shaft 143. The drive unit 150 comprises an electric drive motor 152 is connected through a gearbox 154 for driving the plural drive wheels 141 and 142 through the drive shaft 143 and the gearbox 154. A seat assembly 160 comprises a pedestal 162 mounted to the frame 110 for rotatably supporting a seat 164. The seat 164 comprises a seat base 165 and a backrest 166.

The stabilizer 100 of the present invention comprises stabilizing wheels 170 shown as right and left stabilizing wheels 171 and 172. The right stabilizing wheel 171 is rotatably mounted on a right rotational axle 173 and brackets 175 and 177. The left stabilizing wheel 172 is rotatably mounted on a left rotational axle 174 by 176 and 178. The axels 173 and 174 are orientated in a generally horizontal plane.

Stabilizing wheel journals 280 are shown as right and left stabilizing wheel journals 281 and 282. The right stabilizing wheel journal 181 pivotably mounts the brackets 175 and 177 to the right frame member 113 of the front frame portion 111 of the frame 110 by a right connector 185. Similarly, a left stabilizing wheel journal 182 pivotably mounts the brackets 176 and 178 to the left frame member 114 of the front frame portion 111 of the frame 110 by a left connector 186. The right and left stabilizing wheel journals 181 and 182 define right and left pivot axes 183 and 184.

The right and left pivot axes 183 and 184 are orientated in a generally vertical plane. The right and left stabilizing wheel journals 181 and 182 allow the right and left stabilizing wheels 171 and 172 to pivot about the vertical axes 183 and 184. The right and left horizontal axels 173 and 174 allow the right and left stabilizing wheels 171 and 172 to pivot about the horizontal axes 173 and 174. The right and left pivot axes 183 and 184 in combination with the right and left horizontal axels 173 and 174 provide a caster type freedom of motion for the right and left stabilizing wheels 171 and 172.

Figure 5:
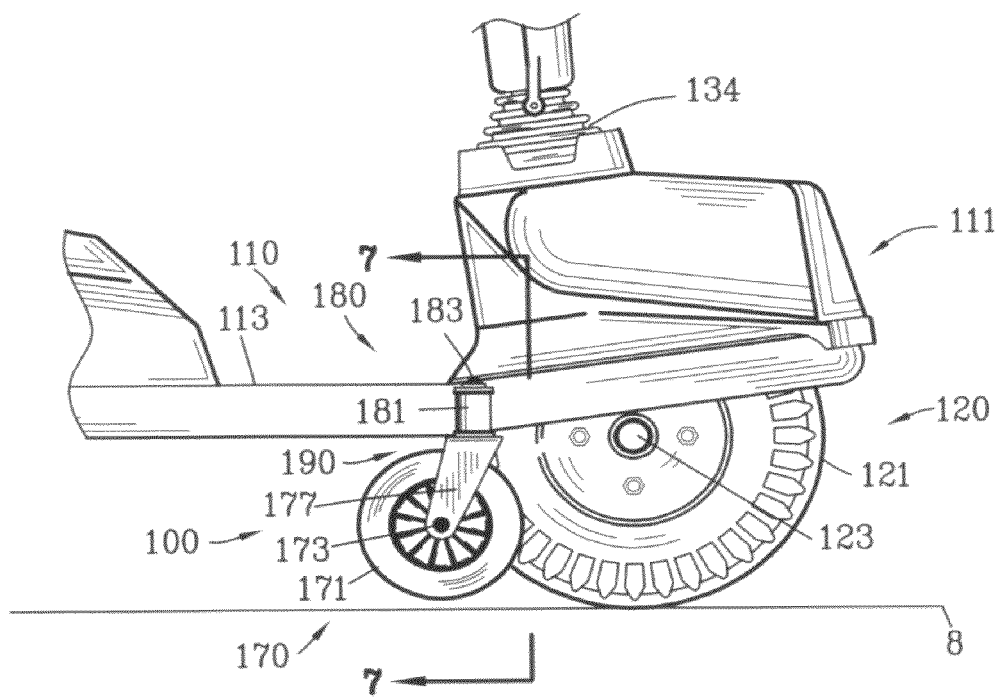
FIG. 5 is an enlarged view of a portion of FIG. 3.
Figure 7:
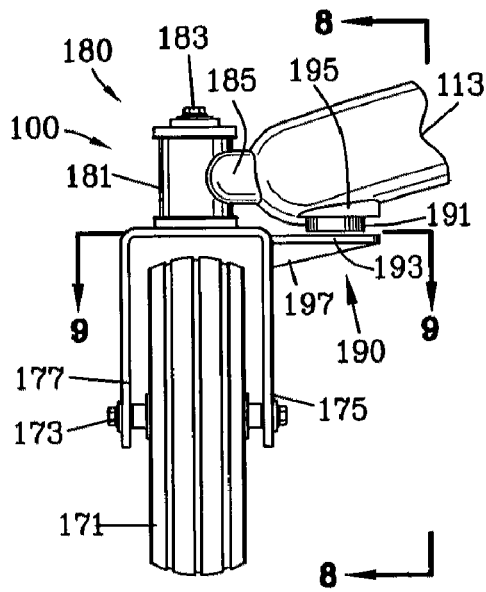
FIG. 7 is a magnified view of a portion of FIG. 5 illustrating a director of the present invention.
Figure 8:
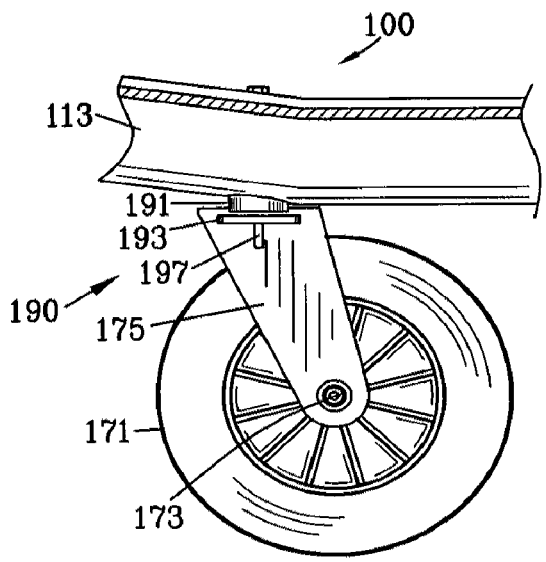
FIG. 8 is a view along line 8-8 in FIG. 7.
Figure 9:
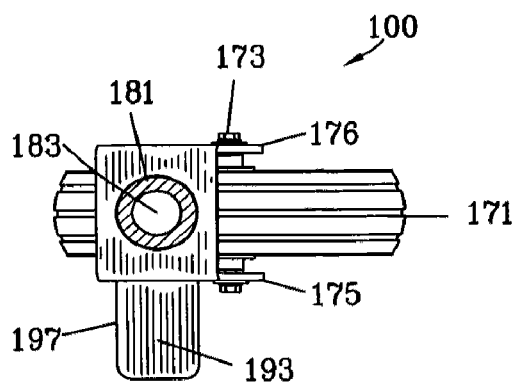
FIG. 9 is a view along line 9-9 in FIG. 7.

FIGS. 7-9 are various magnified views of a portion of FIG. 5 further illustrating the stabilizer 100 of the present invention. The stabilizer 100 of the present invention includes directors 190 for providing an initial preferred alignment to the right and left stabilizing wheels 171 and 172. In this example, the directors 190 are shown as right and left magnets 191 and 192 cooperating with right and left magnetic materials 193 and 194. The right and left magnets 191 and 192 are shown as permanent magnets whereas the right and left magnetic materials 193 and 194 are materials attracted to magnetic fields such as iron material, such as a steel material and the like.

Figure 6:
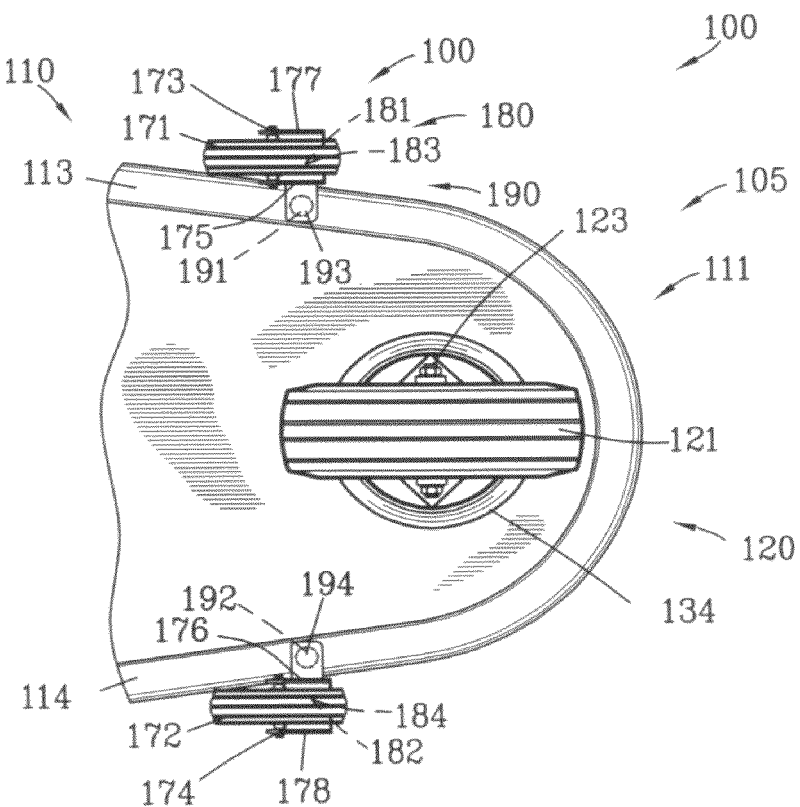
FIG. 6 is a bottom view of FIG. 5.

The right and left magnets 191 and 192 attract the right and left magnetic materials 193 and 194 to pivot the right and left stabilizing wheels 171 and 172 about the right and left pivot axes 183 and 184 into an initial preferred alignment position as best shown in FIG. 6. In this example, the initial preferred alignment position of the right and left stabilizing wheels 171 and 172 is in general alignment with drive shaft 143 interconnecting the plural drive wheels 141 and 142.

FIGS. 10-12 are views similar to FIGS. 7-9 of a further example of directors 190A of the present invention. In this example, the director 190A is shown as right magnet 191A cooperating with right magnets 193A. The right magnets 191A and the right magnet 193A are shown as permanent magnets with the magnetic pole of the right magnet 191A orientated opposite to the magnetic pole of the right magnet 193A. The opposite orientation of the right magnets 191A and the right magnet 193A provides an attractive force to pivot the right wheel 171 about the right pivot axis 183 into an initial preferred alignment position as shown.

As best shown in FIG. 6, a left magnet 192A (shown as 192) cooperates with a right magnet 194A (shown as 194) to provide an initial preferred alignment position for the left stabilizing wheel 172 about the left pivot axis 184 in a manner similar to the right magnet 191A cooperating with right magnets 193A. In the example, the initial preferred alignment position of the right and left stabilizing wheels 171A and 172A are in general with the right and left frame members 113 and 114 shown in FIG. 6.

Figure 13:
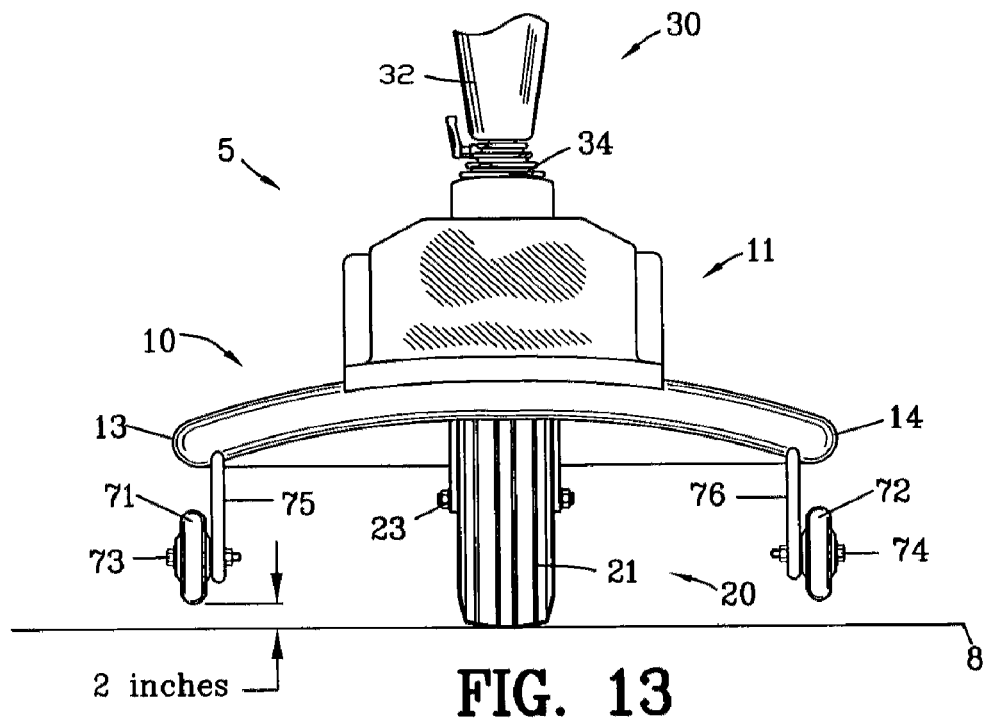
FIG. 13 is a partial front view of the prior art three-wheel vehicle of FIGS. 1 and 2.
Figure 14:
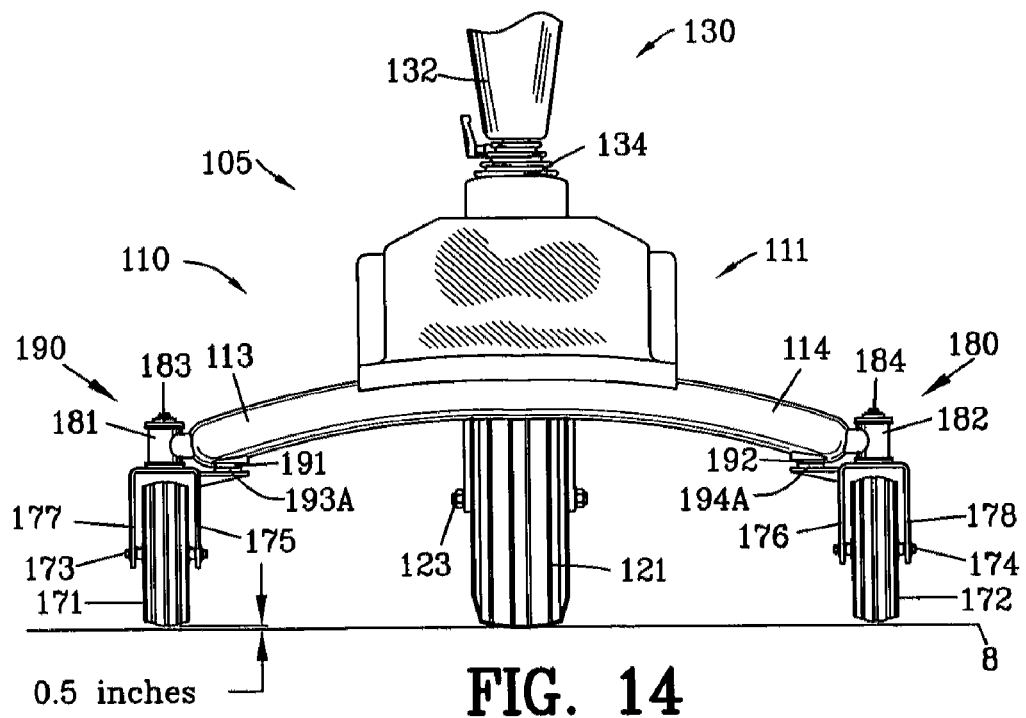
FIG. 14 is a partial front view of the three-wheel vehicle of FIGS. 3-12 incorporating the stabilizer of the present invention.
Figure 15:
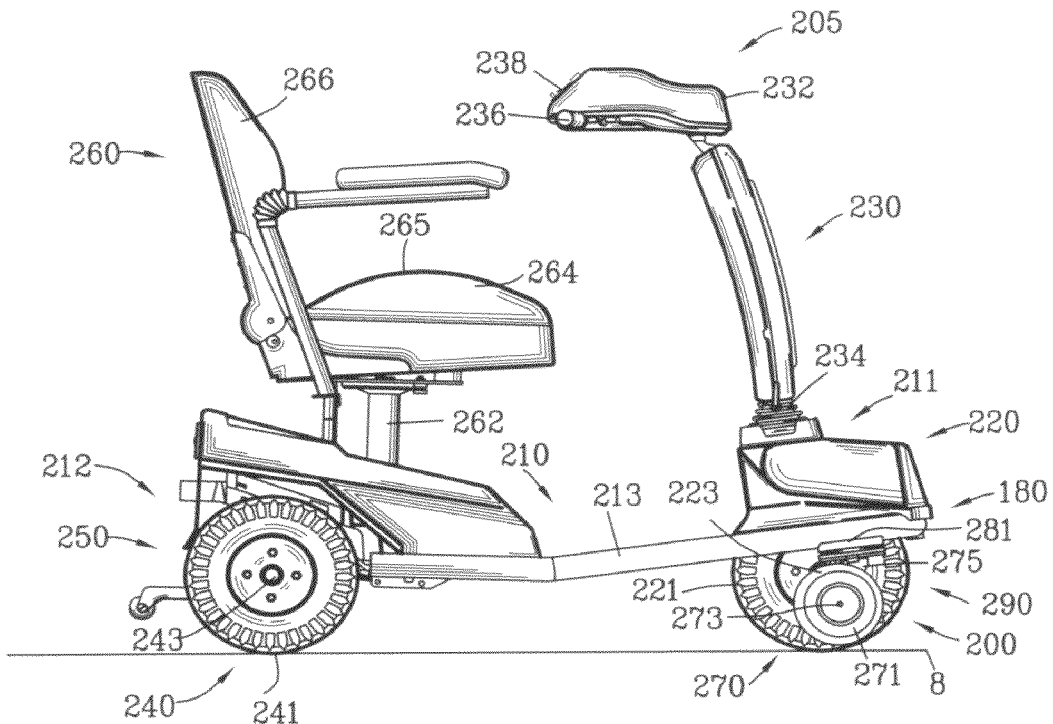
FIG. 15 is a side view of a second embodiment of the stabilizer of the present invention incorporated into a three-wheel vehicle illustrated as a personal mobility vehicle.
Figure 16:
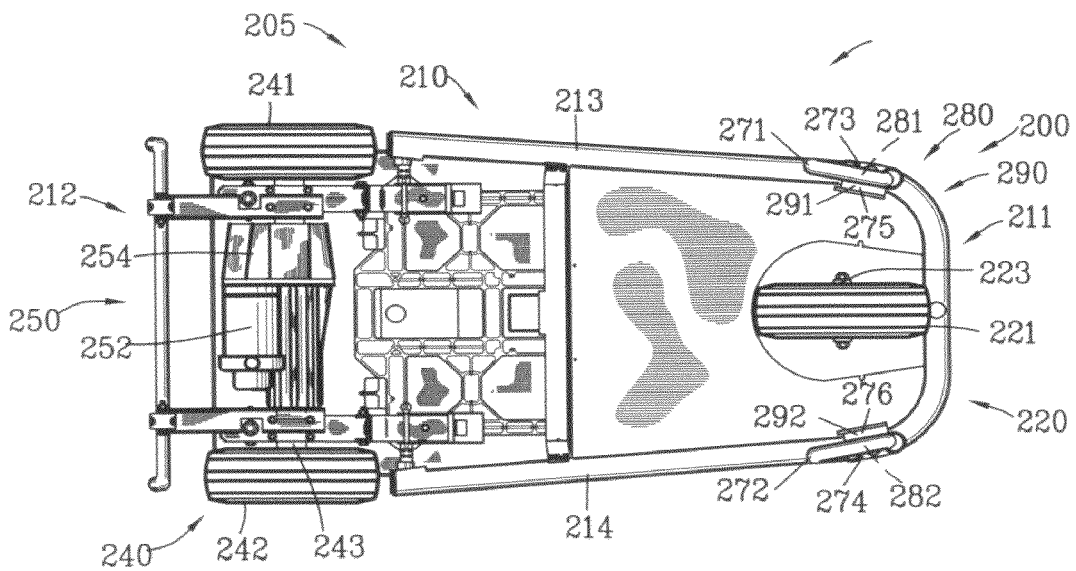
FIG. 16 is a bottom view of FIG. 15.
Figure 17:
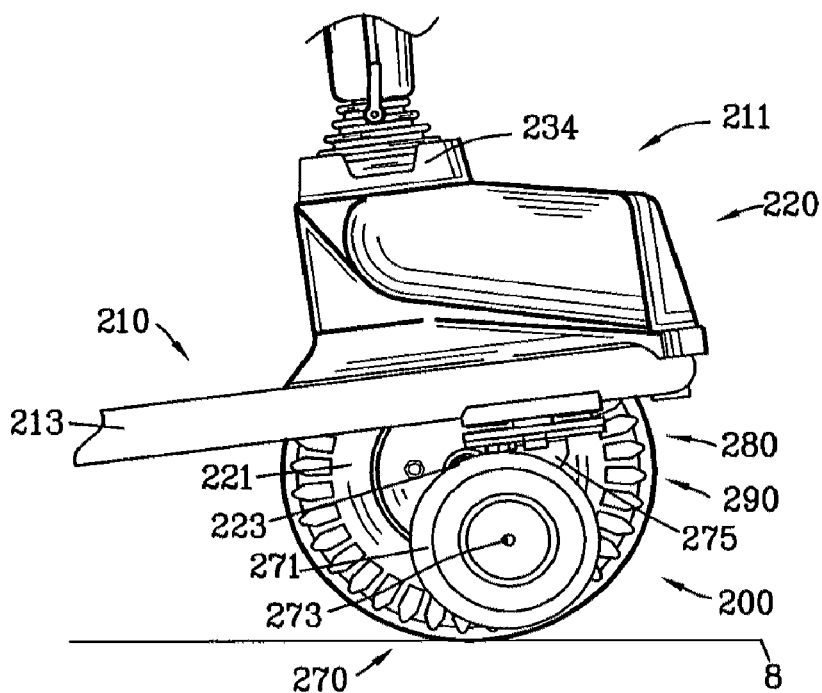
FIG. 17 is an enlarged view of a portion of FIG. 15.
Figure 18:
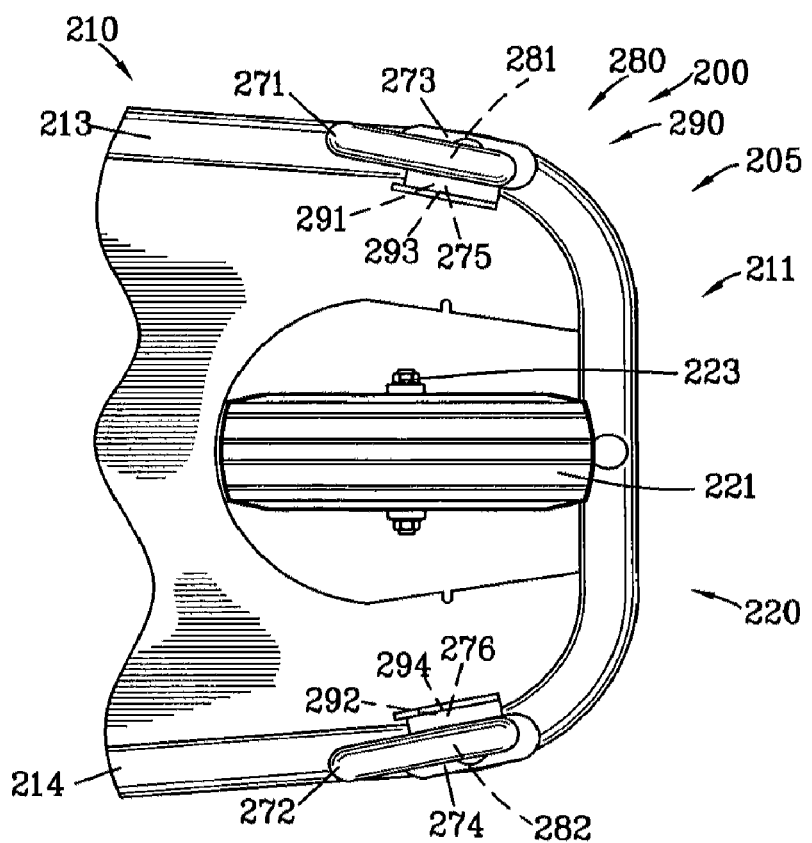
FIG. 18 is a bottom view of FIG. 16.

FIGS. 13 and 14 are partial front views of the prior art three-wheel vehicle 5 of FIGS. 1 and 2 and the three-wheel vehicle 105 of FIGS. 3-12 incorporating the stabilizer 100 of the present invention. The fixed wheels 71 and 72 are permanently mounted to the frame portions 13 and 14 in the prior art three-wheel vehicle 5 of FIGS. 1 and 2. The fixed brackets 75 and 76 are secured to the frame members 13 and 14 to fix the axels 73 and 74 of the fixed wheels 71 and 72 in a position parallel to the drive shaft 43 interconnecting the plural drive wheels 41 and 42. In contrast, the stabilizing wheels 171 and 172 are pivotably mounted to the frame portions 113 and 114 of the three-wheel vehicle 105 of FIGS. 3-12 of the present invention.

The fixed wheels 71 and 72 of the prior art three-wheel vehicle 5 of FIGS. 1 and 2 have an approximate diameter of twenty percent (20%) of the diameter of the front steering wheel 21. In contrast, the stabilizing wheels 171 and 172 of the three-wheel vehicle 105 of FIGS. 3-12 of the present invention have an approximate diameter of fifty percent (50%) of the diameter of the front steering wheel 121.

The fixed wheels 71 and 72 of the prior art three-wheel vehicle 5 of FIGS. 1 and 2 are spaced approximately two inches (2") above the supporting surface 8. This spacing of the fixed wheels 71 and 72 above the supporting surface 8 corresponds to approximately seventy-five percent (75%) of the diameter of the fixed wheels 71 and 72.

In contrast, the stabilizing wheels 171 and 172 of the three-wheel vehicle 105 of FIGS. 3-12 of the present invention are located approximately one-half inches (½") above the supporting surface 8. This spacing of the stabilizing wheels 171 and 172 above the supporting surface 8 corresponds to approximately ten percent (10%) of the diameter of the stabilizing wheels 171 and 172.

FIGS. 15-19 are various views of a second embodiment of the stabilizer 200 of the present invention incorporated into a three-wheel vehicle 205 illustrated as a personal mobility vehicle. Similar parts are labeled with similar reference numbers raised by 100.

The stabilizer 200 of the present invention comprises stabilizing wheels 270 shown as right and left stabilizing wheels 271 and 272. The right and left stabilizing wheels 271 and 272 are rotatably mounting by right and left rotational axle 273 and 274 to right and left brackets 275 and 276. The axels 273 and 274 are orientated in a generally horizontal plane.

Stabilizing wheel journals 280 are shown as right and left stabilizing wheel journals 281 and 282. The right stabilizing wheel journal 281 pivotably mounts the bracket 275 to the right frame member 213 of the front frame portion 211 of the frame 210 by a right connector 285. Similarly, the left stabilizing wheel journal 282 pivotably mounts the bracket 276 to the left frame member 214 of the front frame portion 211 of the frame 210 by a left connector 286. The right and left stabilizing wheel journals 281 and 282 define right and left pivot axes 283 and 284. In this example, the right and left pivot axes 283 and 284 are aligned with a tow-in of ten to fifteen degrees (10-15) from a generally vertical plane.

The right and left stabilizing wheel journals 281 and 282 allow the right and left stabilizing wheels 271 and 272 to pivot about the axes 283 and 284. The right and left horizontal axels 273 and 274 allow the right and left stabilizing wheels 271 and 272 to pivot about the horizontal axes 273 and 274. The right and left pivot axes 283 and 284 in combination with the right and left horizontal axels 273 and 274 provide a towed-in caster type freedom of motion for the right and left stabilizing wheels 271 and 272.

Figure 19:
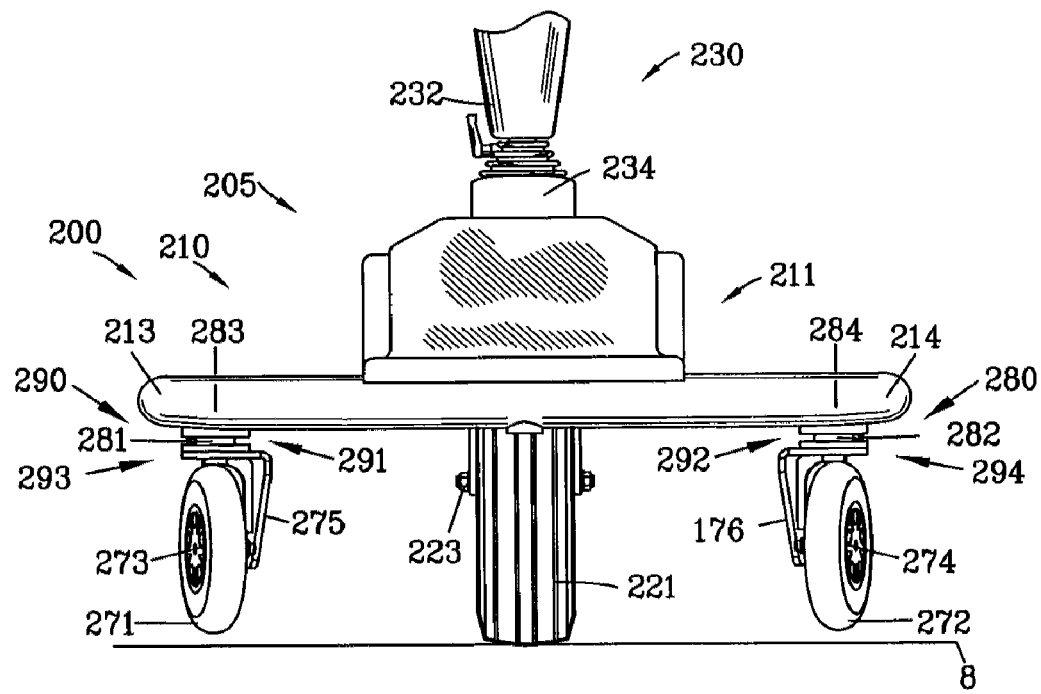
FIG. 19 is a partial front view of the three-wheel vehicle of FIGS. 15-18 incorporating the stabilizer of the present invention.
Figure 20:
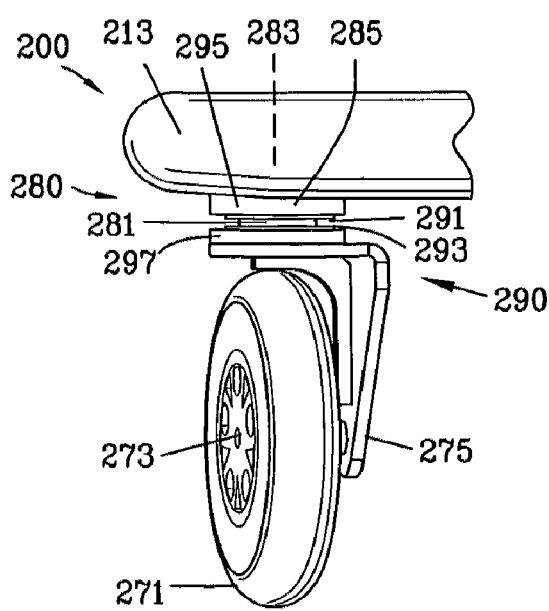
FIG. 20 is a magnified view of a portion of FIG. 19.
Figure 21:
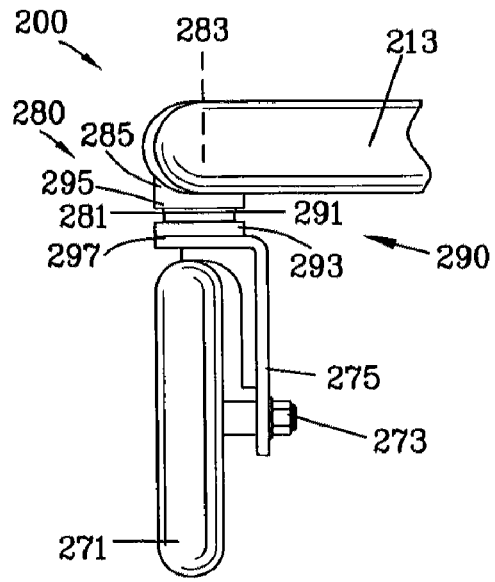
FIG. 21 is a view of FIG. 20 as seen along a line perpendicular to an axis of the stabilizing wheel.
Figure 22:
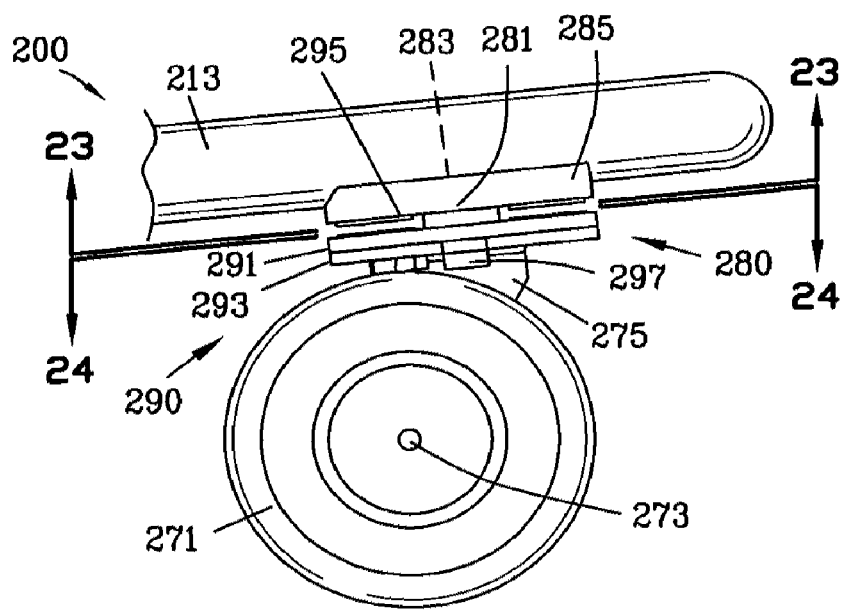
FIG. 22 is a view along line 22-22 in FIG. 21.
Figure 23:
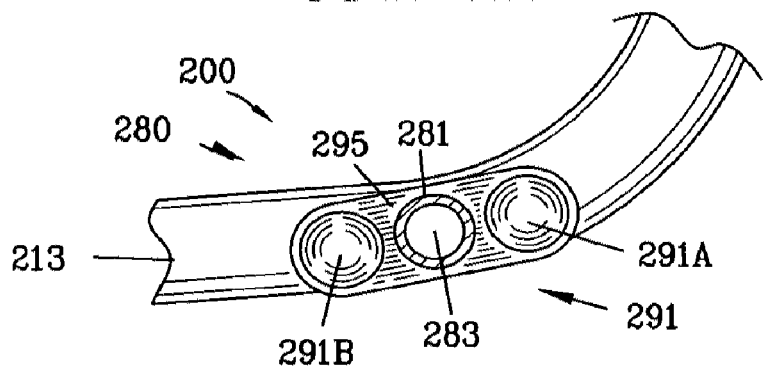
FIG. 23 is a view along line 23-23 in FIG. 22.
Figure 24:
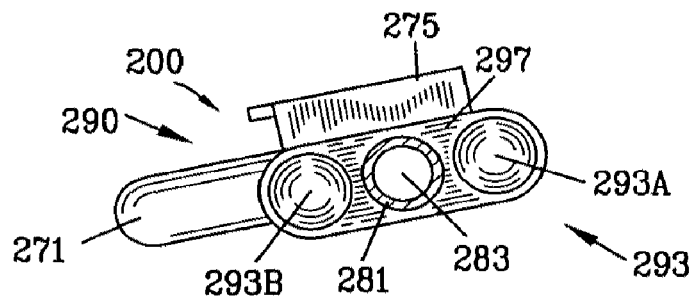
FIG. 24 is a view along line 24-24 in FIG. 22.

FIGS. 20-24 are various magnified views of a portion of FIG. 19 further illustrating the stabilizer 200 of the present invention. The stabilizer 200 of the present invention includes directors 290 for providing an initial preferred alignment to the right and left stabilizing wheels 271 and 272. In this example, the directors 290 are shown as right and left magnets 291 and 292 cooperating with right and left magnets 293 and 294. The right magnets 291 and 293 and the left magnets 292 and 294 are shown as permanent magnets.

In this example, the right magnet 291 comprises right magnet 291A and right magnet 291B located on opposed sides of the right stabilizing wheel journal 281. The right magnet 291A is orientated with an opposite magnetic pole relative to the right magnet 291B. Similarly, the right magnet 293 comprises right magnet 293A and right magnet 293B located on opposed sides of the right stabilizing wheel journal 283 with the right magnet 293A orientated with an opposite magnetic pole relative to the right magnet 293B.

A magnetic attraction of the north and south poles of the right magnets 291A and 291B with the south and north poles of the right magnets 293A and 293B provides an attractive force to pivot the right stabilizing wheel 271 about the right pivot axis 283 into an initial preferred alignment position. Furthermore, a magnetic repulsion of the north and south poles of the right magnets 291A and 291B with the north and south poles of the right magnets 293A and 293B prevents the right wheel 271 from being misaligned one hundred and eighty degrees (180) from the initial preferred alignment position.

Figure 25:
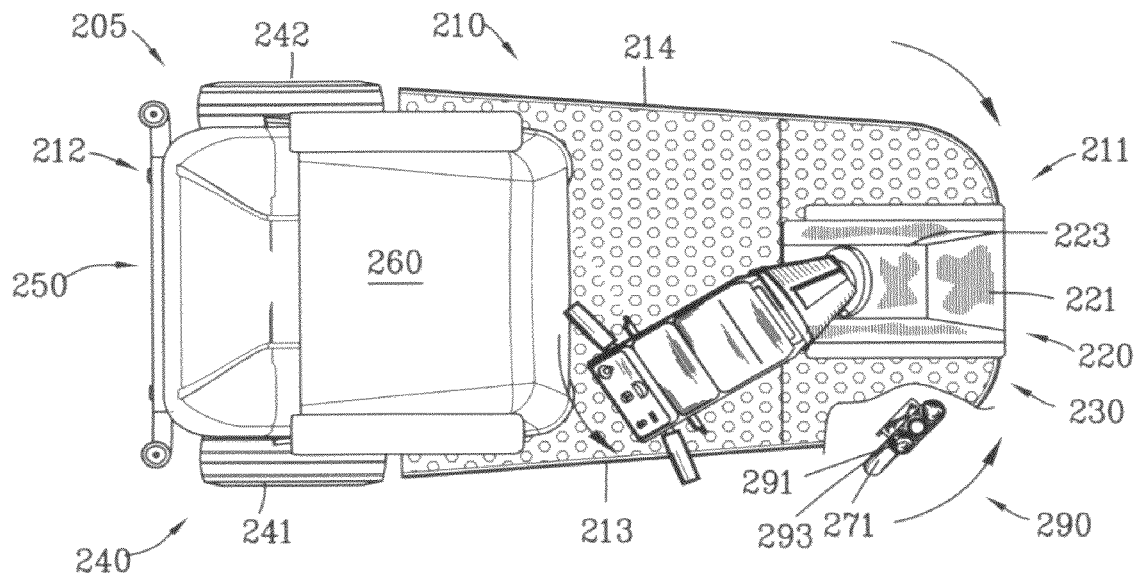
FIG. 25 is a top view of the three-wheel vehicle of FIGS. 15-24 illustrating the movement of a right stabilizing wheel during a left turn.

FIG. 25 is a top view of the three-wheel vehicle 205 of FIGS. 15-24 illustrating the movement of a right stabilizing wheel 271 during a sharp left turn. During a sharp left turn, the three-wheel vehicle 205 leans to the right whereby the right stabilizing wheel 271 engages with the supporting surface 8. The engagement of the right stabilizing wheel 271 with the supporting surface 8 inhibits further leaning of the three-wheel vehicle 205 to the right during the sharp left turn thereby maintaining rear wheel traction and front wheel steering stability. Engagement of the right stabilizing wheel 271 with the supporting surface 8 essentially transforms the three-wheel vehicle 205 into the stability of a four-wheel vehicle with the maneuverability of a three-wheel vehicle.

Figure 26:
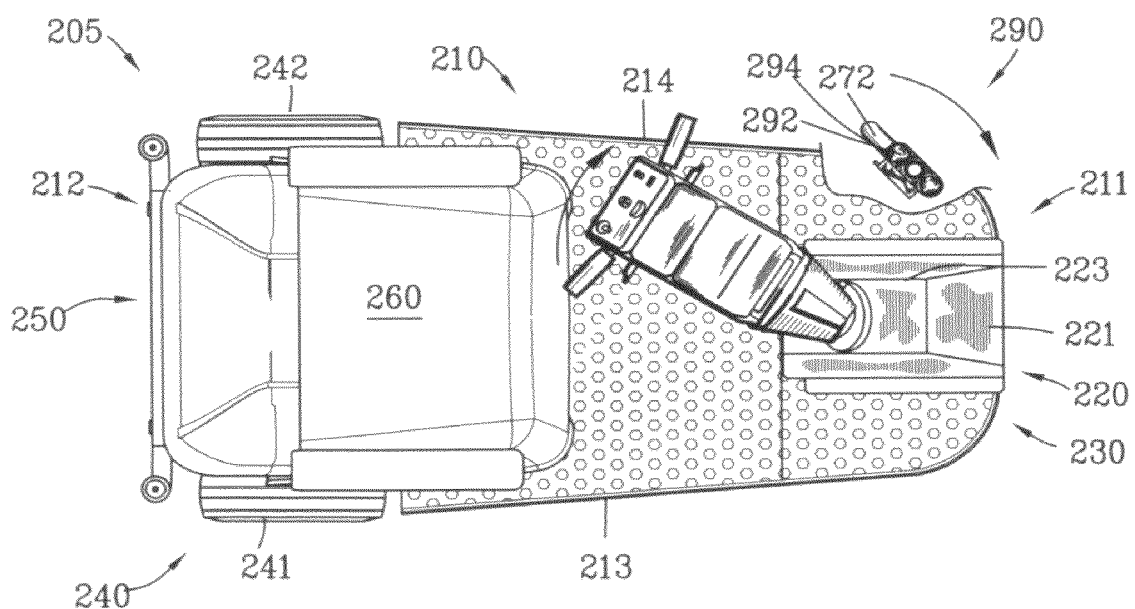
FIG. 26 is a top view of the three-wheel vehicle of FIGS. 15-24 illustrating the movement of a left stabilizing wheel during a right turn.

FIG. 26 is a top view similar to FIG. 25 illustrating the movement of a left stabilizing wheel during a right turn. During a sharp right turn, the three-wheel vehicle 205 leans to the left whereby the left stabilizing wheel 272 engages with the supporting surface 8 to inhibit further leaning of the three-wheel vehicle 205 to the left during the sharp right.

Figure 27:
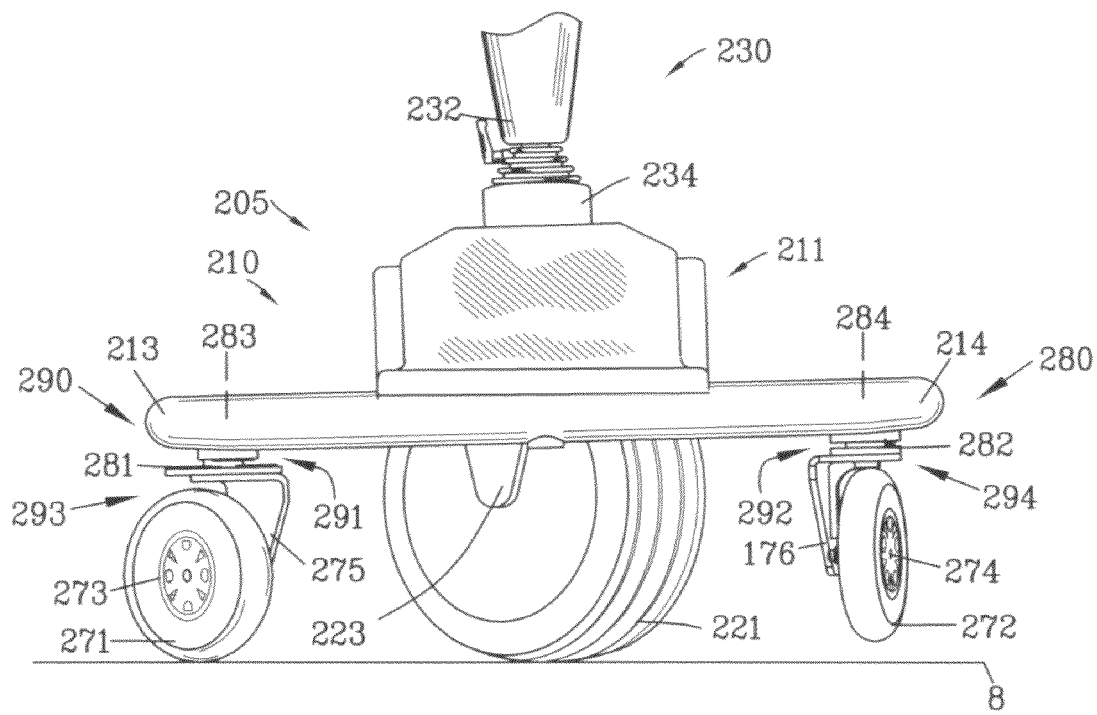
FIG. 27 is a view similar to FIG. 19 illustrating the movement of the right stabilizing wheel during a left turn and the right stabilizing wheels in an initial preferred alignment.
Figure 28:
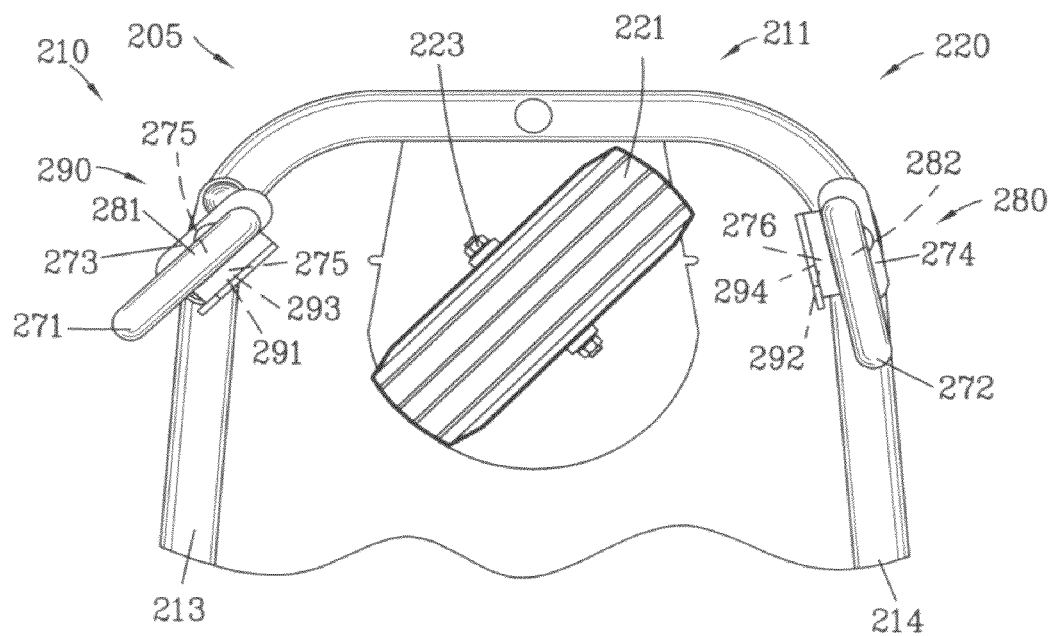
FIG. 28 is a bottom view of FIG. 27.

FIGS. 27 and 28 are views illustrating the movement of the right stabilizing wheel 271 during a sharp left turn. During a sharp left turn, the three-wheel vehicle 205 leans to the right whereby the right stabilizing wheel 271 engages with the supporting surface 8. The initial preferred alignment of the right stabilizing wheel 271 minimizes the pivoting of the right stabilizing wheel 271 about the right stabilizing wheel journal 281.

The left stabilizing wheel 272 is shown in an initial preferred alignment position. The initial preferred alignment of the left stabilizing wheel 272 minimizes the pivoting of the left stabilizing wheel 272 about the left stabilizing wheel journal 282 during a sharp right turn.

Figure 29:
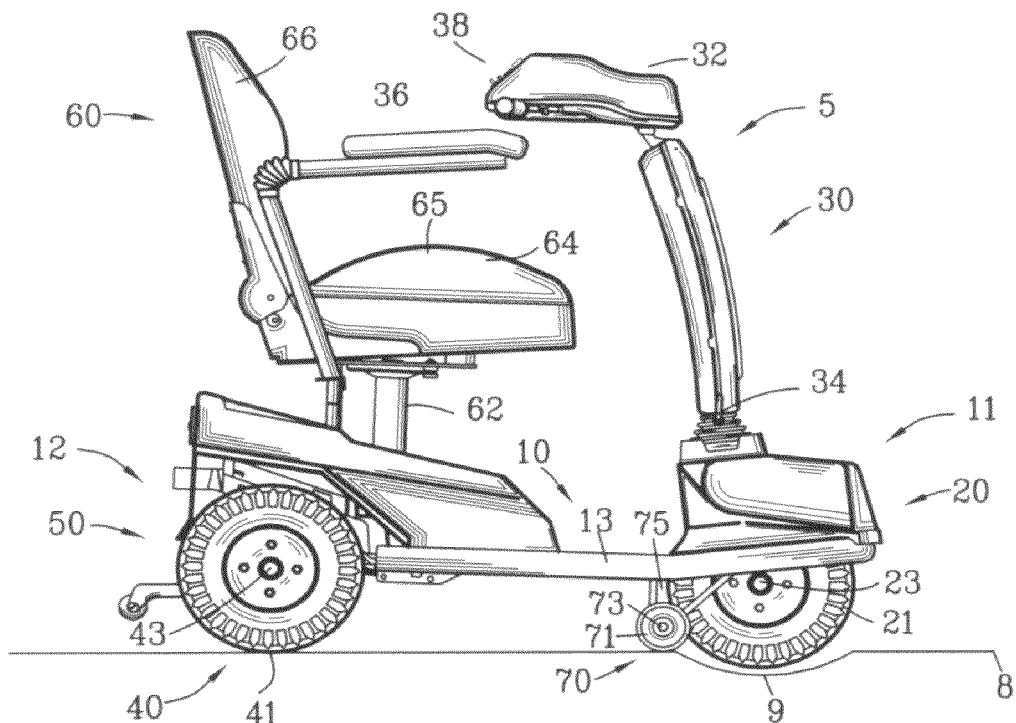
FIG. 29 is a side view of the three-wheel vehicle of the prior art encountering a depression in a supporting surface.

FIG. 29 is a side view of the three-wheel vehicle 5 of the prior art encountering a depression 9 in the supporting surface 8. The fixed wheels 71 and 72 are rotatably mounted by axels 73 and 74 aft of the front axle 23 rotatably mounting the front wheel 21. When three-wheel vehicle 5 of the prior art encountered a depression 9 in the supporting surface 8, the fixed wheels 71 and 72 kept the front wheel 21 from contacting the bottom of the depression 9. In such a circumstance, the front wheel 21 was kept off of any surface by the fixed wheels 71 and 72. Accordingly, the front wheel 21 was unable to control the direction of the three-wheel vehicle 5 of the prior art.

Figure 30:
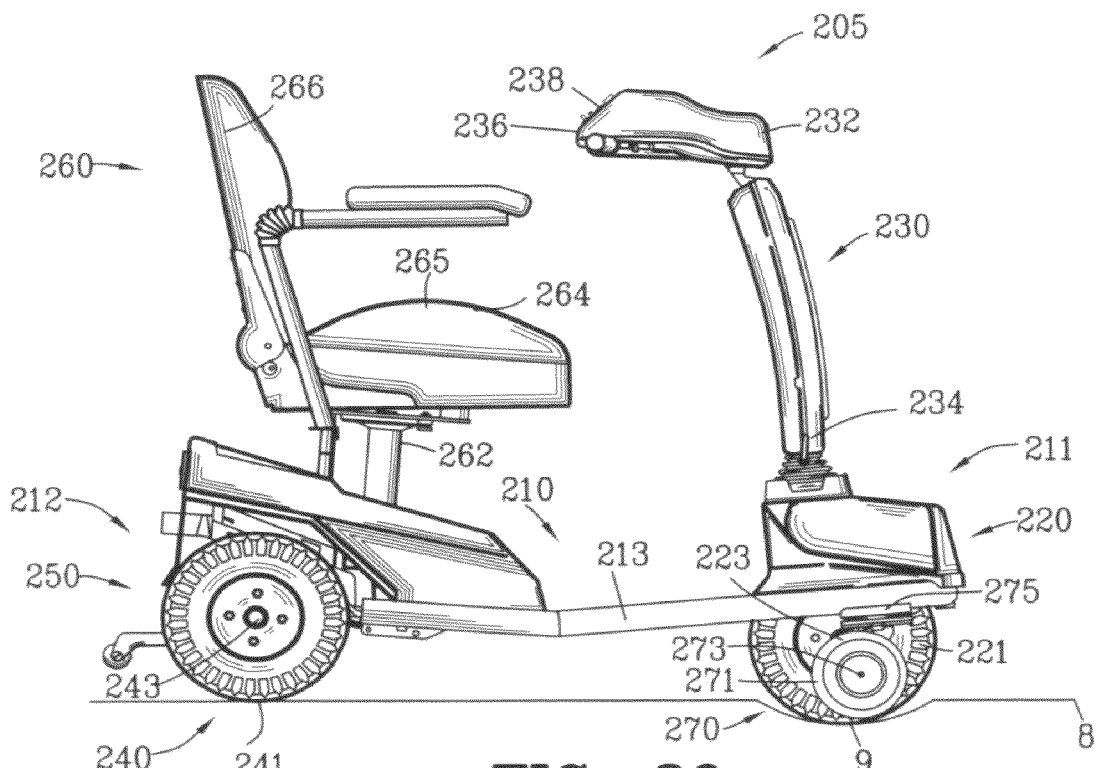
FIG. 30 is a side view of the three-wheel vehicle incorporating the present invention encountering a depression in the supporting surface.

FIG. 30 is a side view of the three-wheel vehicle 5 incorporating the present invention encountering the depression 9 in supporting surface 8. The stabilizing wheels 271 and 272 are rotatably mounted by axels 273 and 274 in alignment with the front axle 223 rotatably mounting the front wheel 221. When three-wheel vehicle 205 incorporating the present invention encountered the depression 9 in the supporting surface 8, the stabilizing wheels 271 and 272 did not keep the front wheel 221 from contacting the bottom of the depression 9. Accordingly, the front wheel 221 was able to control the direction of the three-wheel vehicle 205 during the encounter with the depression 9 in the supporting surface 8.

FIGS. 31 and 32 are views of an example of a vehicle 305 of the prior art incorporating an accessory stabilizer unit 300 of the present invention. The vehicle 305 of the prior art is shown as a foldable personal mobility vehicle as disclosed in U.S. Pat. No. 7,451,848 issued Nov. 18, 2008. Similar parts are labeled with similar reference numbers raised by 100.

The personal mobility vehicle 305 comprises a frame 310 comprising a front frame portion 311 and a rear frame portion 312 defined by frame members 313 and 314. The front frame portion 311 supports a front wheel assembly 320 including a steering mechanism 330 whereas the rear frame portion 312 supports a rear wheel assembly 340 including a drive unit 350.

The front wheel assembly 320 comprises front wheels 321 and 322 rotatably mounted on a front axle 323. Since the front wheels 321 and 322 are closely spaced relative to the center of the personal mobility vehicle 305, the personal mobility vehicle 305 has the characteristics of and may be considered a three wheel vehicle.

The steering mechanism 330 is connected to the front wheel assembly 320. The steering mechanism 330 includes a tiller 332 comprising a handlebar assembly 334 connected to a front steering pivot 336. The front axle 323 is orientated in a generally horizontal plane whereas the front steering pivot 336 is orientated in a generally vertical plane and perpendicular to the front axle 323.

The front steering pivot 336 is mounted to the front wheels 321 and 322 for enabling an operator to pivot the front steering wheels 321 and 322. A movement of the tiller 332 by an operator causes movement of the front steering wheels 321 and 322 to alter the direction of the personal mobility vehicle 305. Control switches 338 are located on the tiller 332 for enabling an operator to control the speed and the rotational direction of the personal mobility vehicle 305.

The rear wheel assembly 340 comprises plural drive wheels 341 and 342 mounted on a drive shaft 343. The drive unit 350 drives the plural drive wheels 341 and 342 through the drive shaft 343.

A seat assembly 360 comprises a foldable support 362 mounted to the frame 310 for supporting a seat 364. The seat 364 comprises a seat base 365 and a backrest 366.

FIG. 33 is a side view of the personal mobility vehicle 305 of FIG. 31 in a folded condition. The personal mobility vehicle 305 may be rotated about an axis 369 into a folded position shown in FIG. 33. A disclosure of the folding mechanism is full discussed in U.S. Pat. No. 7,451,848 issued Nov. 18, 2008 which is incorporated by reference into the present specification as if fully set forth herein. Although the personal mobility vehicle 305 of FIGS. 31-33 has been shown as a foldable personal mobility vehicle 305, it should be understood that the present invention maybe utilized on numerous non-foldable personal mobility vehicles.

Referring back to FIGS. 31 and 32, the accessory stabilizer unit 300 of the present invention comprises stabilizing wheels 370 shown as right and left stabilizing wheels 371 and 372. The right stabilizing wheel 371 is rotatably mounted about a right rotational axle 373 by a bracket 375. The left stabilizing wheel 372 is rotatably mounted about a left rotational axle 374 by a bracket 376. The axels 373 and 374 are orientated in a generally horizontal plane.

The right and left stabilizing wheel journals 381 and 382 allow the right and left stabilizing wheels 371 and 372 to pivot about the vertical axes 383 and 384. The right and left horizontal axels 373 and 374 allow the right and left stabilizing wheels 371 and 372 to pivot about the horizontal axes 373 and 374. The right and left pivot axes 383 and 384 in combination with the right and left horizontal axels 373 and 374 provide a caster type freedom of motion for the right and left stabilizing wheels 371 and 372.

The accessory stabilizer unit 300 of the present invention includes directors 390 for providing an initial preferred alignment to the right and left stabilizing wheels 371 and 373. In this example, the directors 390 are shown right and left magnets 391 and 392 for providing an initial preferred alignment to the right and left stabilizing wheels 371 and 373.

FIGS. 34-36 are magnified views of a portion of FIG. 31 illustrating the right side of the accessory stabilizer unit 300 comprising the right stabilizing wheel 371, the right stabilizing wheel journal 381 and the right magnet 391. The left stabilizing wheel 372, the left stabilizing wheel journal 382 and the left magnet 392 are a mirror image of FIGS. 34-36.

The right stabilizing wheel 371 is rotatably mounted about a right rotational axle 373 by the bracket 375. The bracket 375 is connected to a right bracket plate 401. A right interconnector 403 affixes the right connector 385 to a right bracket base 405. The right stabilizing wheel journal 381 is fixed between the right connector 385 and the right bracket plate 401 to pivot the right stabilizing wheels 371 about the vertical, axis 383. A right bracket extension 407 is also connected to the right stabilizing wheel journal 381. The right connector 385 is provided with holes 409 whereas the right bracket extension 407 is provided with holes 413 for mounting to the personal mobility vehicle 305.

In this example, the right magnet 391 comprises right magnets 391A 391B located on the right connector 385 and the right bracket extension 407 cooperating with right magnets 393A and 393B located on the right bracket plate 401. The right magnets 391A and 391B are orientated with an opposite magnetic pole relative to the right magnets 393A and 393B. The cooperation of the right magnets 391A and 391B with the right magnets 393A and 393B provides an attractive force to pivot the right wheel 371 about the right pivot axis 383 into an initial preferred alignment position. Furthermore, the cooperating with right magnets 391A and 391B with the with right magnets 393A and 393B prevents the right wheel 371 from being misaligned one hundred and eighty degrees (180) from the initial preferred alignment position.

The accessory stabilizer unit 300 is secured to the prior art personal mobility vehicle 305 by suitable fasteners. In this example, the accessory stabilizer unit 300 is secured to the prior art personal mobility vehicle 305 by mechanical fasteners in the following manner. A plurality of holes are drilled into the front frame portion 311 of the frame 310 to correspond with the position of the holes 409 in the right connector 385 and the holes 413 in the right bracket extension 407. Bolts 417 and nuts 419 secure the accessory stabilizer unit 300 to the personal mobility vehicle 305.

FIGS. 37 and 38 are views similar to FIGS. 27 and 28 of the three-wheel vehicle 205 of the present invention illustrating the operation of the right stabilizing wheel 271 during a sharp left turn. During a sharp left turn, the three-wheel vehicle 205 leans to the right whereby the right stabilizing wheel 271 engages with the supporting surface 8. The front steering wheel 221 and the right stabilizing wheel 271 engage with the supporting surface 8 in contact areas 221C and 271C, respectively. The initial preferred alignment of the right stabilizing wheel 271 minimizes the pivoting of the right stabilizing wheel 271 about the right stabilizing wheel journal 281. The initial preferred alignment of the right stabilizing wheel 271 assists in the turning of the three-wheel vehicle 205.

FIGS. 39 and 40 are views similar to FIGS. 37 and 38 of a hypothetical three-wheel vehicle 5H incorporating fixed large anti-tip wheels 71H and 72H. The hypothetical three-wheel vehicle 5H is not the three-wheel vehicle 5 of the prior art as shown in FIGS. 1 and 2, but is a hypothetical three-wheel vehicle 5H proposed by the present inventor for illustrating a further feature of the present invention.

In contrast to the three-wheel vehicle 5 of the prior art, the anti-tip wheels 71H and 72H have a diameter commensurate with the diameter of the stabilizing wheels 271 and 272 of the present invention shown in FIGS. 37 and 38. In further contrast to the three-wheel vehicle 5 of the prior art, the anti-tip wheels 71H and 72H are mounted on axles 73H and 74H positioned in proximity to the axle 23H of the front steering wheel 21H.

In a manner similar to the anti-tip wheels 71 and 72 of the three-wheel vehicle 5 of the prior art, the anti-tip wheels 71H and 72H of the hypothetical three-wheel vehicle 5H are secured by fixed brackets 75H and 76H to the frame members 13H and 14H of the front frame portion 11H of the frame 10H. The axels 73H and 74H of the anti-tip wheels 71H and 72H are fixed in a forward position relative to the frame 10H.

FIG. 40 illustrates the engagement of the front steering wheel 21H and the right anti-tip wheel 71H with the supporting surface 8 in contact areas 21HC and 71HC, respectively. The contact area 21HC of the front steering wheel 21H promotes movement of the hypothetical three-wheel vehicle 5H in a left turn direction whereas the contact area 71HC of the fixed right anti-tip wheel 71H promotes movement of the hypothetical three-wheel vehicle 5H in a forward direction. The conflict between the favored forward direction of movement of the right anti-tip wheel 71H and the left turn direction of movement of the front steering wheel 21H creates instability in the hypothetical three-wheel vehicle 5H during the turning process.

The hypothetical three-wheel vehicle 5H set forth in FIGS. 39 and 40 demonstrates that merely enlarging the diameter of the anti-tip wheels 71H and 72H and positioning anti-tip wheels 71H and 72H in proximity to the axle 23H of the front steering wheel 21H does not increase the stability of the hypothetical three-wheel vehicle 5H. Accordingly, enlarging the diameter of the anti-tip wheels 71 and 72 and positioning anti-tip wheels 71 and 72 forward in the three-wheel vehicle 5 of the prior art will not increase the stability of the three-wheel vehicle 5 of the prior art shown in FIGS. 1 and 2.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. In a three-wheel vehicle having a frame extending between a front portion and a rear portion with the front portion of the frame supporting a front steering wheel and with the rear portion of the frame supporting plural driving wheels for moving the three-wheel vehicle on a supporting surface, the improvement comprising:
a right stabilizing wheel rotatably mounted on a right stabilizing rotational axis;
a right stabilizing pivoting axis for pivotably mounting said right stabilizing wheel on a right side of the frame;
a left stabilizing wheel rotatable mounted on a left stabilizing rotational axis;
a left stabilizing pivoting axis for pivotably mounting said left stabilizing wheel on a left side of the frame;
said right and left stabilizing wheels being independent of the front steering wheel and positioned above the supporting surface when the three-wheel vehicle moves in a straight direction on the supporting surface; and
said right and left stabilizing wheels engaging the supporting surface when the vehicle is turned in a right and a left direction respectively for stabilizing the three-wheel vehicle.

2. A device as set forth in claim 1, wherein the three-wheel vehicle is a scooter type personal mobility vehicle.

3. A device as set forth in claim 1, including a front pivotable axis for pivoting said front steering wheel to steer the three-wheel vehicle;
a front rotational axis for rotating said front steering wheel upon movement of the three-wheel vehicle on the supporting surface; and
said front pivotable axis being perpendicular to said front rotational axis.

4. A device as set forth in claim 1, including a right and left director for directing said right and left stabilizing wheels in a forward direction when said right and left stabilizing wheels are positioned above the supporting surface.

5. A device as set forth in claim 1, including a front pivotable axis for pivoting said front steering wheel to steer the three-wheel vehicle;
a front rotational axis for rotating said front steering wheel upon movement of the three-wheel vehicle on the supporting surface; and
a right and left director for directing said right and left stabilizing wheels in a forward direction independent of said front pivotable axis of said front steering wheel when said right and left stabilizing wheels are positioned above the supporting surface.

6. A device as set forth in claim 1, wherein
said right stabilizing pivoting axis is generally parallel to said left stabilizing pivoting axis.

7. A device as set forth in claim 1, wherein
said right stabilizing pivoting axis is offset generally parallel to said left stabilizing pivoting axis.

8. In a three-wheel vehicle having a frame extending between a front portion and a rear portion with the front portion of the frame supporting a front steering wheel and with the rear portion of the frame supporting plural driving wheels for moving the three-wheel vehicle on a supporting surface, the improvement comprising:
a right and a left stabilizing wheel mounted on a right and a left side of the frame;
a right and left magnetic director for directing said right and left stabilizing wheels in a forward direction when said right and left stabilizing wheels are positioned above the supporting surface;
said right and left stabilizing wheels being positioned above the supporting surface when the three-wheel vehicle moves in a straight direction on the supporting surface; and
said right and left stabilizing wheels engaging the supporting surface when the vehicle is turned in a right and a left direction respectively for stabilizing the three-wheel vehicle.

9. A device as set forth in claim 1; including a right director comprising a right projection cooperating with a right magnet connected between the frame and said right stabilizing wheel for directing said right stabilizing wheel in a forward direction when said right stabilizing wheel is positioned above the supporting surface; and
a left director comprising a left projection cooperating with a left magnet connected between the frame and said left stabilizing wheel for directing said left stabilizing wheel in a forward direction when said left stabilizing wheel is positioned above the supporting surface.

10. A device as set forth in claim 1, including a right director comprising a right projection connected to the right stabilizing wheel cooperating with a right magnet connected to the frame for directing said right stabilizing wheel in a forward direction when said right stabilizing wheel is positioned above the supporting surface; and a left director comprising a left projection connected to the left stabilizing wheel cooperating with a left magnet connected to the frame for directing said left stabilizing wheel in a forward direction when said left stabilizing wheel is positioned above the supporting surface.

11. In a scooter type personal mobility three-wheel vehicle having a frame extending between a front portion and a rear portion with the front portion of the frame supporting a front wheel having a front wheel axle and with the rear portion of the frame supporting plural driving wheels for moving the three-wheel vehicle on a supporting surface, the improvement comprising:
- a right and a left stabilizing wheel having right and left stabilizing wheel axles;
- a right caster mounting for locating said right stabilizing wheel on a right side of the front portion of the frame and positioned above a supporting surface when the three-wheel vehicle moves in a straight direction on the supporting surface;
- a left caster mounting for locating said left stabilizing wheel to a left side of the front portion of the frame and positioned above a supporting surface when the three-wheel vehicle moves in a straight direction on the supporting surface;
- a right and left magnetic director for directing said right and left stabilizing wheels in a forward direction when said right and left stabilizing wheels are positioned above the supporting surface; and
- said right and left stabilizing wheels engaging the supporting surface when the three-wheel vehicle is turned in a right and a left direction respectively for stabilizing the turning of the three wheel vehicle.

12. A device as set forth in claim 11, wherein said right magnetic director comprises a right projection cooperating with a right magnet connected between the frame and said right stabilizing wheel for directing said right stabilizing wheel in a forward direction when said right stabilizing wheel is positioned above the supporting surface; and
- said left magnetic director comprising a left projection cooperating with a left magnet connected between the frame and said left stabilizing wheel for directing said left stabilizing wheel in a forward direction when said left stabilizing wheel is positioned above the supporting surface.

13. A device as set forth in claim 11, wherein said right magnetic director comprises a right projection connected to the right stabilizing wheel cooperating with a right magnet connected to the frame for directing said right stabilizing wheel in a forward direction when said right stabilizing wheel is positioned above the supporting surface; and
- said left magnetic director comprising a left projection connected to the left stabilizing wheel cooperating with a left magnet connected to the frame for directing said left stabilizing wheel in a forward direction when said left stabilizing wheel is positioned above the supporting surface.

14. A device as set forth in claim 11, wherein said right and left stabilizing wheel axles of said right and left stabilizing wheel are in generally vertical alignment with said front steering wheel axle of said front wheel.

15. A stabilized three-wheel personal mobility vehicle for moving on a supporting surface, comprising:
- a frame extending between a front portion and a rear portion;
- a front steering wheel mounted to said front portion of the frame for steering the three-wheel vehicle on the supporting surface;
- plural driving wheels mounted to said rear portion of the frame for driving the three-wheel vehicle on the supporting surface;
- a right and a left stabilizing wheel;
- a right caster mounting for locating said right stabilizing wheel on said right side of the front portion of the frame and positioned above a supporting surface when the three-wheel vehicle moves in a straight direction on the supporting surface;
- a left caster mounting for locating said left stabilizing wheel to said left side of the front portion of the frame and positioned above a supporting surface when the three-wheel vehicle moves in a straight direction on the supporting surface;
- said right and left caster mountings mounting said right and left stabilizing wheel to be independently movable from said front steering wheel;
- said right and left stabilizing wheels engaging the supporting surface when the three-wheel vehicle is turned in a right and a left direction respectively for stabilizing the three-wheel vehicle; and
- said right and left stabilizing wheels engaging the supporting surface when the three-wheel vehicle is turned in a right and a left direction respectively for stabilizing the turning of the three wheel vehicle.

16. A stabilized three-wheel personal mobility vehicle as set forth in claim 15, including a right magnetic director comprising a right projection cooperating with a right magnet connected between the frame and said right stabilizing wheel for directing said right stabilizing wheel in a forward direction when said right stabilizing wheel is positioned above the supporting surface; and
- a left magnetic director comprising a left projection cooperating with a left magnet connected between the frame and said left stabilizing wheel for directing said left stabilizing wheel in a forward direction when said left stabilizing wheel is positioned above the supporting surface.

17. A stabilized three-wheel personal mobility vehicle as set forth in claim 16, wherein said right magnetic director comprises a right projection connected to the right stabilizing wheel cooperating with a right magnet connected to the frame for directing said right stabilizing wheel in a forward direction when said right stabilizing wheel is positioned above the supporting surface; and
- said left magnetic director comprising a left projection connected to the left stabilizing wheel cooperating with a left magnet connected to the frame for directing said left stabilizing wheel in a forward direction when said left stabilizing wheel is positioned above the supporting surface.

18. The method of stabilizing a three-wheel vehicle during a sharp turn on a supporting surface, the three-wheel vehicle having a front steering wheel and plural rear driving wheels, comprising the steps of:
- providing a right and a left caster wheel located in proximity to the front steering wheel;
- directing the right and left caster wheels in a forward direction independent of the front steering wheel when the right and left caster wheels are positioned above the supporting surface; and
- positioning the right and a left caster wheels a distance above the supporting surface for enabling the right and a left caster wheels to engage the supporting surface and to provide stability during a left and a right sharp turn, respectively.

19. An accessory stabilizer unit for a three-wheel vehicle having a frame extending between a front portion and a rear portion with the front portion of the frame supporting a front steering wheel and with the rear portion of the frame supporting plural driving wheels for moving the three-wheel vehicle on a supporting surface, the accessory stabilizer unit, comprising:
- a right stabilizing wheel rotatably mounted on a right stabilizing rotational axis;
- a right stabilizing pivoting axis for pivotably mounting said right stabilizing wheel on said right stabilizing rotational axis;
- a left stabilizing wheel rotatable mounted on a left stabilizing rotational axis;
- a left stabilizing pivoting axis for pivotably mounting said left stabilizing wheel on said left stabilizing rotational axis;
- a right and a left strut for mounting said right and left stabilizing pivoting axis of said right and left stabilizing wheel to a right and a left side of the three-wheel vehicle;
- said right and left stabilizing wheels being independently movable from said front steering wheel and positioned above the supporting surface when the three-wheel vehicle moves in a straight direction on the supporting surface; and
- said right and left stabilizing wheels engaging the supporting surface when the vehicle is turned in a right and a left direction respectively for stabilizing the three-wheel vehicle.

20. An accessory stabilizer unit as set forth in claim 19, including mechanical fasteners for securing the accessory stabilizer unit to the three-wheel vehicle.

21. An accessory stabilizer unit for a three-wheel vehicle having a frame extending between a front portion and a rear portion with the front portion of the frame supporting a front steering wheel and with the rear portion of the frame supporting plural driving wheels for moving the three-wheel vehicle on a supporting surface, the accessory stabilizer unit, comprising:
- a right and a left stabilizing wheel having right and left stabilizing wheel axles;
- a right and a left caster mounting for mounting said right and left stabilizing wheel axles;
- a right and a left strut for mounting said right and left caster mountings to a right and a left side of the three-wheel vehicle of the front portion of the frame and positioned above a supporting surface when the three-wheel vehicle moves in a straight direction on the supporting surface;
- a right and left director for directing said right and left stabilizing wheels in a forward direction when said right and left stabilizing wheels are positioned above the supporting surface; and
- said right and left stabilizing wheels engaging the supporting surface when the three-wheel vehicle is turned in a right and a left direction respectively for stabilizing the turning of the three wheel vehicle.

\* \* \* \* \*